United States Patent
Kaino et al.

(10) Patent No.: US 9,383,620 B2
(45) Date of Patent: Jul. 5, 2016

(54) ELECTROPHORETIC DEVICE, METHOD OF MANUFACTURING THE SAME, AND DISPLAY

(71) Applicant: Sony Corporation, Tokyo (JP)

(72) Inventors: Yuriko Kaino, Kanagawa (JP); Ken Kobayashi, Kanagawa (JP); Aya Shuto, Kanagawa (JP); Hidehiko Takanashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 347 days.

(21) Appl. No.: 13/680,942

(22) Filed: Nov. 19, 2012

(65) Prior Publication Data

US 2013/0127702 A1  May 23, 2013

(30) Foreign Application Priority Data

Nov. 22, 2011  (JP) ................... 2011-255212
Nov. 22, 2011  (JP) ................... 2011-255213
Oct. 22, 2012  (JP) ................... 2012-232700

(51) Int. Cl.
*G02B 26/00* (2006.01)
*G02F 1/133* (2006.01)
*G09G 3/34* (2006.01)
*G03G 13/00* (2006.01)
*G02F 1/167* (2006.01)
*G02F 1/01* (2006.01)

(52) U.S. Cl.
CPC .............. *G02F 1/167* (2013.01); *G02F 1/0102* (2013.01); *G02F 2001/1678* (2013.01); *Y10T 29/49002* (2015.01)

(58) Field of Classification Search
CPC ............ G02F 1/167; G02F 1/03; G02F 1/133; G02F 1/061; G02F 2001/1678; G02B 26/00; G02B 26/08; G02B 26/26
USPC ......... 359/296, 253–254, 245, 290–291, 298; 349/33; 345/49, 105, 107; 430/31–32
See application file for complete search history.

(56) References Cited

U.S. PATENT DOCUMENTS

| 3,892,568 | A | 7/1975 | Ota | |
|---|---|---|---|---|
| 5,276,438 | A * | 1/1994 | DiSanto et al. | 345/107 |
| 7,990,602 | B2 * | 8/2011 | Tatsuura et al. | 359/270 |
| 2001/0005567 | A1 * | 6/2001 | Harada et al. | 430/32 |
| 2001/0041339 | A1 * | 11/2001 | Anderson et al. | 435/6 |
| 2003/0044843 | A1 * | 3/2003 | Tanaka et al. | 435/7.1 |
| 2007/0121193 | A1 * | 5/2007 | Akashi et al. | 359/296 |
| 2011/0301465 | A1 * | 12/2011 | Waki | 600/445 |
| 2012/0099182 | A1 * | 4/2012 | Ogawa | 359/296 |

FOREIGN PATENT DOCUMENTS

| JP | 50-015115 | 6/1975 |
|---|---|---|
| JP | 50-015120 | 6/1975 |
| JP | 2002-244163 | 8/2002 |
| JP | 2005-107146 | 4/2005 |
| JP | 2005-128143 | 5/2005 |
| JP | 4188091 | 11/2008 |

* cited by examiner

*Primary Examiner* — Dawayne A Pinkney
(74) *Attorney, Agent, or Firm* — CHIP Law Group

(57) ABSTRACT

An electrophoretic device includes: a plurality of electrophoretic particles in an insulating liquid; and a porous layer formed of a fibrous structure in the insulating liquid, the fibrous structure having a polarity same as a polarity of the electrophoretic particles.

25 Claims, 5 Drawing Sheets

ELECTROPHORETIC DEVICE, METHOD OF MANUFACTURING THE SAME, AND DISPLAY

CROSS REFERENCES TO RELATED APPLICATIONS

The present application claims priority to Japanese Priority Patent Application JP 2011255212 filed in the Japan Patent Office on Nov. 22, 2011, Japanese Priority Patent Application JP 2011255213 filed in the Japan Patent Office on Nov. 22, 2011, Japanese Priority Patent Application JP 2012232700 filed in the Japan Patent Office on Oct. 22, 2012, the entire content of which is hereby incorporated by reference.

BACKGROUND

The present disclosure relates to an electrophoretic device that includes a plurality of electrophoretic particles in an insulating liquid and to a method of manufacturing the electrophoretic device. The present disclosure also relates to a display that includes the electrophoretic device.

In recent years, a demand for a display with low power consumption and high-grade image quality has been increased as a result of widespread use of mobile devices typified by devices such as mobile phones and personal digital assistants. In particular, a personal digital assistant (an electronic book terminal) for reading application in order to read character information for a long time has attracted attention recently as a result of launch of the distribution service of the electronic books. This leads to a demand for a display that has a display grade suitable for such an application.

As a display for reading application, a display such as a cholesteric liquid crystal display, an electrophoretic display, an electrochromic display, and a twist-ball display has been proposed. In particular, a reflective display is preferable. One reason is that this provides a display grade similar to that of paper since the reflective display performs light display by utilizing reflection (scattering) of outside light as paper does. Another reason is that this lowers electric power consumption since a backlight is not necessary in the reflective display.

A major candidate of the reflective display is the electrophoretic display that creates contrast by utilizing an electrophoresis phenomenon. One reason for this is that the electrophoretic display achieves low electric power consumption and is superior in high-speed response. Hence, various studies have been made on a display method of an electrophoretic display.

Specifically, a method has been proposed in which two types of charged particles that have different optical reflection characteristics are dispersed in an insulating liquid, and the charged particles are transferred in response to an electric field (for example, see Japanese Examined Patent Application Publication No. S50-015115 and Japanese Patent No. 4188091). In this method, a distribution state of the charged particles varies in response to the electric field since the two types of charged particles have polarities opposite to each other.

Further, a method has been proposed in which a porous layer is arranged in an insulating liquid and charged particles are dispersed in the insulating liquid, and the charged particles are transferred through fine pores of the porous layer in response to an electric field (for example, see Japanese Unexamined Patent Application Publication Nos. 2005-107146, 2005-128143, and 2002-244163, and Japanese Examined Patent Application Publication No. S50-015120). In this method, for example, a polymer film that has fine pores formed by laser drilling, fabric woven with a material such as a synthetic fiber, an open-cell porous polymer, or the like may be used as the porous film.

SUMMARY

Although various display methods have been proposed for an electrophoretic display, the display grade thereof is insufficient. Taking into considerations that the electrophoretic display may be further expanded to, for example, color display, video display, etc., it is necessary to further improve display characteristics, more specifically, to further improve contrast and response speed.

It is desirable to provide an electrophoretic device capable of achieving high contrast and high-speed response. It is also desirable to provide a method of manufacturing the above-described electrophoretic device and a display.

According to an embodiment of the present application, there is provided an electrophoretic device including: a plurality of electrophoretic particles in an insulating liquid; and a porous layer formed of a fibrous structure in the insulating liquid, the fibrous structure having a polarity same as a polarity of the electrophoretic particles.

According to an embodiment of the present application, there is provided a method of manufacturing an electrophoretic device, the method including: forming an electrophoretic particle having a polarity; and configuring a porous layer and forming a fibrous structure having a polarity same as the polarity of the electrophoretic particle.

According to an embodiment of the present application, there is provided a display including an electrophoretic device between a pair of bases, one or both of the bases being optically transmissive, and each of the bases including an electrode. The electrophoretic device includes a plurality of electrophoretic particles in an insulating liquid, and a porous layer formed of a fibrous structure in the insulating liquid, the fibrous structure having a polarity same as a polarity of the electrophoretic particles.

In the electrophoretic device and the method of manufacturing the electrophoretic device according to an embodiment of the present application, the fibrous structure that configures the porous layer has a polarity same as that of the electrophoretic particles. This suppresses absorption of the electrophoretic particles by the fibrous structure when the electrophoretic particles pass through the fibrous structure.

According to an embodiment of the present application, there is provided an electrophoretic device including: a plurality of electrophoretic particles in an insulating liquid; and a porous layer formed of a fibrous structure in the insulating liquid, the fibrous structure including a plurality of non-migrating particles, and the non-migrating particles being added to in an amount within a predetermined range and dispersed in the fibrous structure.

According to an embodiment of the present application, there is provided a method of manufacturing an electrophoretic device, the method including: determining an optimal range of an amount of non-migrating particles added to and mixed in a fibrous structure; and adding the non-migrating particles having an amount within the optimal range to the fibrous structure and dispersing the added non-migrating particles in the fibrous structure.

According to an embodiment of the present application, there is provided a display including an electrophoretic device between a pair of bases, one or both of the bases being optically transmissive, and each of the bases including an electrode. The electrophoretic device includes a plurality of electrophoretic particles in an insulating liquid, and a porous layer formed of a fibrous structure in the insulating liquid, the fibrous structure including a plurality of non-migrating particles, the non-migrating particles having reflection characteristics different from reflection characteristics of the electrophoretic particles, and the non-migrating particles being added to in an amount within a predetermined range and dispersed in the fibrous structure.

In the electrophoretic device and the method of manufacturing the electrophoretic device according to an embodiment of the present application, the non-migrating particles are added to in an amount within the predetermined range and dispersed in the fibrous structure that configures the porous layer. This secures a path for the electrophoretic particles to transfer and improves optical scattering efficiency due to the non-migrating particles.

According to the electrophoretic device and the method of manufacturing the electrophoretic device of the embodiment of the present application, the fibrous structure that configures the porous layer has a polarity same as that of the electrophoretic particles. Therefore, absorption of the electrophoretic particles by the fibrous structure at the time when the electrophoretic particles pass through the fibrous structure is suppressed, and contrast is improved. Accordingly, it is possible to provide a high-grade display with improved display characteristics.

According to the electrophoretic device and the method of manufacturing the electrophoretic device of the embodiment of the present application, the non-migrating particles are added to in an amount within the predetermined range and dispersed in the fibrous structure that configures the porous layer. Therefore, a path for the electrophoretic particles to transfer is secured and the optical scattering efficiency due to the non-migrating particles is improved. Accordingly, it is possible to improve response speed and to improve contrast.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

Hereinafter, preferred embodiments of the present application will be described in detailed with reference to the drawings. The description will be given in the following order.

1. First Embodiment (an example in which a functional group is introduced to a fibrous structure)
   1-1. General Configuration
   1-2. Method of Forming Porous Layer
2. Second Embodiment (an example in which a chemical substance is added to a fibrous structure)
3. Application Example
4. Examples

[1. First Embodiment]
[Electrophoretic Device]

Figure 1:
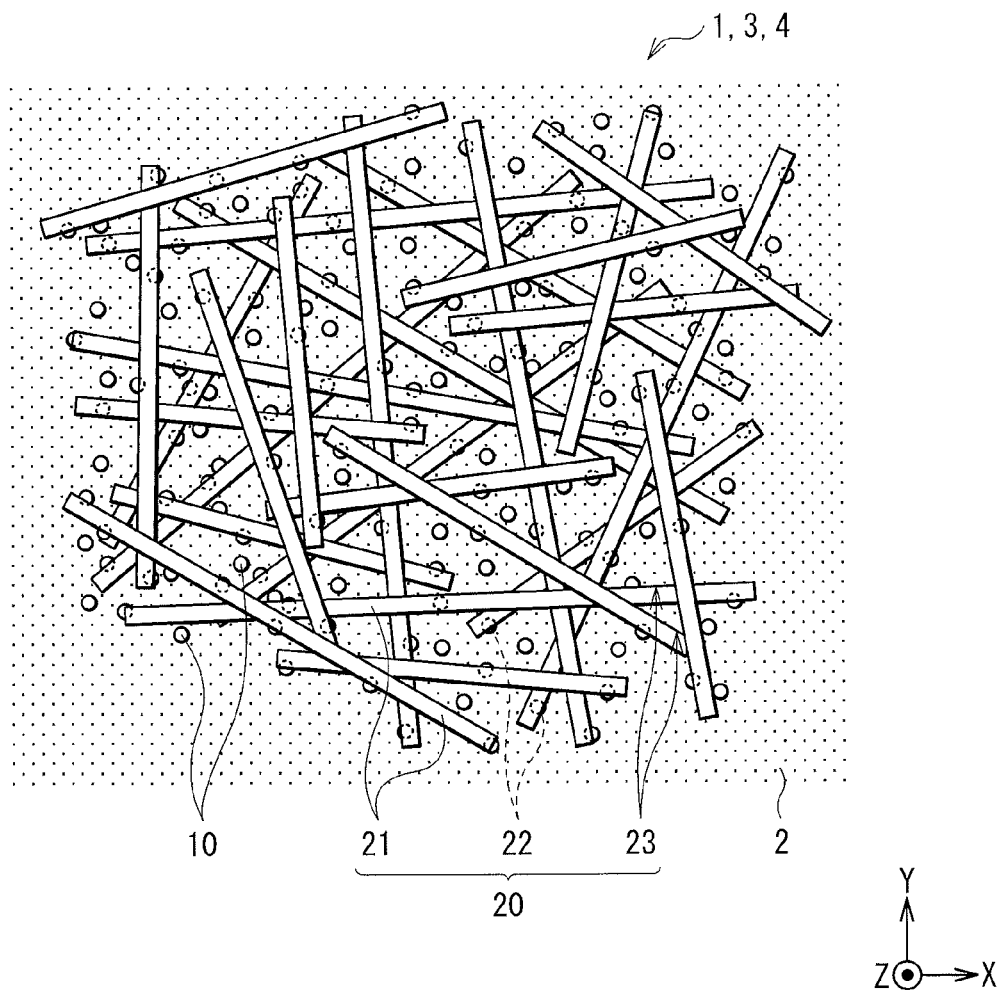
FIG. 1 is a plan view illustrating a configuration of an electrophoretic device according to any one of first to third embodiments of the present application.
Figure 2:
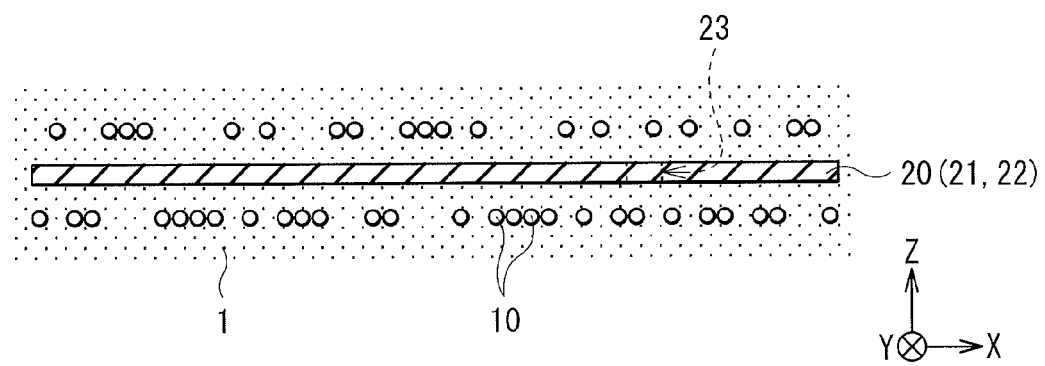
FIG. 2 is a cross-sectional view illustrating the configuration of the electrophoretic device.

FIG. 1 and FIG. 2 illustrate a plan configuration and a cross-sectional configuration of an electrophoretic device 1 of a first embodiment of the present application, respectively. The electrophoretic device 1 creates contrast by utilizing an electrophoresis phenomenon. The electrophoretic device 1 may be applied to, for example, various electronic apparatuses such as displays. The electrophoretic device 1 includes a plurality of electrophoretic particles 10 having a polarity, and a porous layer 20 in an insulating liquid 2. In the present embodiment, a fibrous structure 21 that configures the porous layer 20 has a polarity same as that of the electrophoretic particles 10.

The fibrous structure 21 configures the porous layer 20, and is a fibrous material that has a length sufficiently large with respect to a fiber diameter thereof. The fibrous structure 21 of the present embodiment has a polarity same as the polarity of the electrophoretic particles 10 as described above. Specifically, a surface of the fibrous structure 21 is modified with a functional group that has a polarity same as that of the electrophoretic particles 10. The electrophoretic device 1 of the present embodiment that utilizes the electrophoresis phenomenon creates contrast by difference in optical reflection characteristics (hereinafter, simply referred to as "reflection characteristics") between the electrophoretic particles 10 and the porous layer 20. Specifically, when an electric filed is applied to the electrophoretic device 1, the electrophoretic particles 10 transfer, in a region to which the electric field is applied, through fine pores 23 that are formed by configuring the fibrous structure 21 to have a three-dimensional structure. Thus, display is switched between light display and dark display. The electrophoretic particles 10 are charged particles that each have a polarity. The surface of the electrophoretic particle 10 is bonded to a functional group that has acceptor properties or donor properties, which will be described in detail later. Therefore, when the fibrous structure 21 has a polarity opposite to that of the electrophoretic particles 10, the electrophoretic particles 10 may be absorbed by the fibrous structure 21 or may be prevented by the fibrous structure 21 from transferring in passing through the fine pores 23. This may lead to degradation in display characteristics. On the other hand, in the present embodiment, a functional group that has a polarity same as that of the electrophoretic particles 10 are attached to the surface of the fibrous structure 21. Thus, the absorption of the electrophoretic particles 10 by the fibrous structure 21 in the fine pores 23 is suppressed.

A functional group bonded to the surface of the fibrous structure 21 is not particularly limited as long as the functional group has a polarity same as that of the electrophoretic particles 10. To give an example, in addition to an amine-based functional group (such as an amino group, an imino group, and an amide group), a silicon atom (Si), a titanium atom, an aluminum atom, siloxane (—Si—O—), titanate (—Ti—O—), or aluminate (—Al—O—) may be bonded to the surface of the fibrous structure 21. The type of bonding between the fibrous structure 21 and the above-described functional group is not specifically limited, however, covalent bonding is preferable. As described above, the electrophoretic particles 10 transfer through the inside of the fine pores 23 that are formed in the fibrous structure 21. Hence, it can be considered that the electrophoretic particles 10 touch the fibrous structure 21. Therefore, when the force of bonding between the fibrous structure 21 and the above-described functional group is weak, the above-described functional group may be desorbed from the fibrous structure 21.

A method of modifying the fibrous structure 21, namely, a surface processing method for the fibrous structure 21 is not particularly limited. However, modification, namely, surface processing of the fibrous structure 21 is preferably performed under moderate conditions. For example, it is preferable to utilize a gas-phase reaction with use of a silane coupling agent. One reason for this is that it is necessary to perform the modification without changing the structure of the fibrous structure 21 since the gap (fine pore 23) configured by the fibrous structure 21 and the structure of the fibrous structure 21 may be considered important in the electrophoretic device 1. The general configuration of the electrophoretic device will be described below.

[1-1. General Configuration]

[Insulating Liquid]

The insulating liquid 2 may be, for example, one or more of organic solvents. Specifically, the insulating liquid 2 may be, for example, an organic solvent such as paraffin and isoparaffin. It is preferable that viscosity and refractive index of the insulating liquid 2 be as low as possible. One reason is that this improves mobility (response speed) of the electrophoretic particles 10 and lowers energy (consumed electric power) necessary to transfer the electrophoretic particles 10, accordingly. Another reason is that this enlarges the difference between the refractive index of the insulating liquid 2 and the refractive index of the porous layer 20, and thereby, increases the reflectance of the porous layer 20.

It is to be noted that the insulating liquid 2 may include various materials on an as-necessary basis. Examples of the various materials include colorants, charge-controlling agents, dispersion stabilizers, viscosity modifiers, surfactants, and resins.

[Electrophoretic Particle]

The electrophoretic particle 10 is a charged particle that is dispersed in the insulating liquid 2 and is transferable through the fine pores 23 of the porous layer 20 in response to electric-field application. The electrophoretic particle 10 may be configured of, for example, one or more of particles (powder) of materials such as organic pigments, inorganic pigments, dye, carbon materials, metal materials, metal oxides, glass, and polymer materials (resins). Further, the electrophoretic particle 10 may be, for example, a particle such as a pulverized particle and a capsule particle of solid resin that includes the above-described particles. It is to be noted that materials corresponding to the carbon materials, the metal materials, the metal oxides, the glass, and the polymer materials are excluded from materials corresponding to the organic pigments, the inorganic pigments, and the dye.

Examples of the organic pigments include azo-based pigments, metal complex azo-based pigments, polycondensation azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigments include zinc oxide, antimony white, carbon black, iron black, titanium boride, colcothar, mapico yellow, red lead, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include nigrosine-based dye, azo-based dye, phthalocyanine-based dye, quinophthalone-based dye, anthraquinone-based dye, and methine-based dye. Examples of the carbon materials include carbon black. Examples of the metal materials include gold, silver, and copper. Examples of the metal oxides include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer materials include polymer compounds to which a functional group that has a light absorption range in a visible light range is introduced. The type of the polymer compound is not particularly limited as long as the polymer compound has a light absorption range in the visible light range as described above.

A content (concentration) of the electrophoretic particles 10 in the insulating liquid 2 is not particularly limited, however, to give an example, the content thereof may be from 0.1 wt % to 10 wt % both inclusive. One reason is that this secures shielding properties and mobility of the electrophoretic particles 10. In the present embodiment, when the content of the electrophoretic particles 10 is lower than 0.1 wt %, it may be difficult for the electrophoretic particles 10 to shield (hide) the porous layer 20. On the other hand, when the content thereof is higher than 10 wt %, the dispersibility of the electrophoretic particles 10 is lowered. This may make it difficult for the electrophoretic particles 10 to migrate, and may make the electrophoretic particles 10 to aggregate in some cases.

The electrophoretic particles 10 may have any reflection characteristics (reflectance). The reflection characteristics of the electrophoretic particles 10 are not particularly limited. However, it is preferable that the electrophoretic particles 10 shield at least the porous layer 20. One reason for this is that the difference in reflection characteristics between the electrophoretic particles 10 and the porous layer 20 causes contrast.

Here, a specific material for forming the electrophoretic particles 10 is selected depending on the role of the electrophoretic particles 10 to cause contrast. Specifically, examples of the material used when the electrophoretic particles 10 perform light display include: metal oxides such as titanium oxide, zinc oxide, zirconium oxide, barium titanate, and potassium titanate; inorganic salts such as barium sulfate and calcium carbonate; organic compounds such as bisstyryl derivertives (for example, see Japanese Unexamined Patent Application Publication No. H11-130975) and polyvinyl-naphthalene fine particles; and hollow fine particles. On the other hand, examples of the material used when the electrophoretic particles 10 perform dark display include carbon materials and metal oxides. Examples of the carbon materials include carbon black. Examples of the metal oxides include copper-chromium oxide, copper-manganese oxide, copper-iron-manganese oxide, copper-chromium-manganese oxide, and copper-iron-chromium oxide.

When the electrophoretic particles 10 perform light display, the color of the electrophoretic particles 10 that is visible when the electrophoretic device 1 is seen from the outside thereof is not particularly limited as long as contrast is caused thereby. However, in particular, a color close to white is preferable and white is more preferable. On the other hand, when the electrophoretic particles 10 perform dark display, the color of the electrophoretic particles 10 that is visible when the electrophoretic device 1 is seen from the outside thereof is not particularly limited as long as contrast is caused thereby. However, a color close to black is preferable and black is more preferable. One reason for this is that contrast is high in either of the cases.

Further, it is preferable that the electrophoretic particles 10 be easily dispersed and electrically charged for a long time in the insulating liquid 2, and be difficult to be absorbed by the porous layer 20. Therefore, a dispersant (or an electric-charge modifier) may be used to disperse the electrophoretic particles 10 by electrostatic repulsion, or surface processing may be performed on the electrophoretic particles 10. Also, both of them may be performed.

Examples of the dispersant include Solsperse series available from The Lubrizol Corporation, BYK series and Anti-Terra series available from BYK-Chemie GmbH, and Span series available from ICI Americas Inc.

Examples of the surface processing include rosin processing, surfactant processing, pigment derivative processing, coupling agent processing, graft polymerization processing, and microencapsulation processing. In particular, graft polymerization processing, microencapsulation processing, or a combination thereof is preferable. One reason is that this may provide, for example, dispersion stability for a long time.

A material provided for surface processing may be, for example, a material (absorptive material) that includes a functional group that is absorbable by the surface of the electrophoretic particles 10 and a polymerizable functional group. The type of the absorbable functional group is determined depending on the material for forming the electrophoretic particles 10. To give an example, the absorbable functional group may be an aniline derivative such as 4-vinylaniline with respect to a carbon material such as carbon black, and may be an organosilane derivative such as 3-(trimethoxysilye propyl methacrylate with respect to a metal oxide. Examples of the polymerizable functional group include a vinyl group, an acryl group, and a methacryl group.

Further, the material for surface processing may be, for example, a material (graft material) graftable to the surface of the electrophoretic particles 10 to which a polymerizable functional group is introduced. The graft material preferably includes a polymerizable functional group and a functional group for dispersion that is dispersable into the insulating liquid 2 and is allowed to retain dispersibility by steric hindrance. The type of the polymerizable functional group is similar to those described for the absorptive material. The functional group for dispersion may be, for example, a group such as a branched alkyl group when the insulating liquid 2 is paraffin. For example, a polymeraization initiator such as azobisisobutyronitrile (AIBN) may be used in order to polymerize and graft the graft material.

For reference, the detail of the method of dispersing the electrophoretic particles 10 in the insulating liquid 2 as described above is described in books such as "technology of dispersing ultrafine particles and evaluation thereof~surface processing, pulverizing, and stabilization of dispersion in gas, liquid, and polymer~" (published by Science & technology Co., Ltd.).

[Porous Layer]

The porous layer 20 is a three-dimensional structure formed of the above-described fibrous structure 21, and includes a plurality of fine pores 23. The fibrous structure 21 includes a plurality of non-migrating particles 22. In other words, the non-migrating particles 22 are held by the fibrous structure 21. The porous layer 20 which is a three-dimensional structure may include one fibrous structure 21 that is tangled randomly, or may include a plurality of fibrous structures 21 that are gathered and overlaid randomly. Alternatively, the porous layer 20 may include both. When the plurality of fibrous structures 21 are included, each of the fibrous structures 21 holds one or more non-migrating particles 22. It is to be noted that FIG. 2 illustrates a case in which the porous layer 20 is formed with the plurality of fibrous structures 21.

One reason why the porous layer 20 is a three-dimensional structure formed with the fibrous structure 21 is that light (outside light) is diffused (multiply scattered), and therefore, the reflectance of the porous layer 20 is increased and the thickness of the porous layer 20 is allowed to be thin to obtain the high reflectance. Accordingly, contrast caused by the electrophoretic device 1 is increased and the energy necessary for transferring the electrophoretic particles 10 is lowered. Further, another reason is that the average pore diameter and the number of the fine pores 23 are increased, and therefore, the electrophoretic particles 10 become easy to transfer through the fine pores 23. Accordingly, response speed is increased and the energy necessary to transfer the electrophoretic particles 10 is lowered.

The fibrous structure 21 includes the plurality of non-migrating particles 22 since light becomes easier to be diffused, and therefore, the reflectance of the porous layer 20 is increased. Thus, contrast caused by the electrophoretic device 1 becomes further higher.

The fibrous structure 21 may be, for example, one or more of polymer materials and inorganic materials, or may be other materials. Examples of the polymer materials include nylon, polylactate, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrolidone, polyvinylidene fluoride, poly hexafluoropropylene, cellulose acetate, collagen, gelatin, chitosan, and copolymers thereof. Examples of the inorganic materials include titanium oxide. In particular, a polymer material is preferable for a material forming the fibrous structure 21. One reason for this is that the above-described materials have low reactivity (such as optical reactivity), in other words, are chemically stable, and therefore, an unintentional decomposition reaction of the fibrous structure 21 is suppressed. It is to be noted that, when the fibrous structure 21 is formed of a material that has high reactivity, the surface of the fibrous structure 21 is preferably covered with any protective film (not illustrated).

The shape (appearance) of the fibrous structure 21 is not particularly limited as long as the fibrous structure 21 has a length that is sufficiently large with respect to the fiber diameter thereof, as described above. Specifically, the fibrous structure 21 may be linear, may be curled, or may be bent in a point thereof. Also, an extending direction of the fibrous structure 21 is not limited to one direction and the fibrous structure 21 may be branched in one or more directions in some points thereof. A method of forming the fibrous structure 21 is not particularly limited. To give an example, it is preferable that the fibrous structure 21 be formed by a method such as a phase separation method, a phase inversion method, an electrostatic (electric-field) spinning method, a dissolution spinning method, a wet spinning method, a dry spinning method, a gel spinning method, a sol-gel spinning method, and a spray coating method. One reason is that this allows easy and stable formation of a fibrous material that has a length sufficiently large with respect to the fiber diameter thereof.

The average fiber diameter of the fibrous structure 21 is not particularly limited. However, it is preferable that the average fiber diameter thereof is as small as possible. One reason is that this allows light to be easily diffused and allows the pore diameter of the fine pore 23 to be larger. It is to be noted that the average fiber diameter may be set to allow the fibrous structure 21 to hold the non-migrating particle 22 described later. Therefore, the average fiber diameter of the fibrous structure 21 is preferably equal to or less than 10 µm. It is to be noted that the lower limit of the average fiber diameter is not particularly limited. To give an example, the lower limit of the average fiber diameter is 0.1 µm, and may be less than 0.1 µm. The average fiber diameter may be measured, for example, by microscope observation with the use of a microscope such as a scanning electron microscope. It is to be noted that the average length of the fibrous structure 21 may be any length.

In particular, the fibrous structure 21 is preferably a nanofiber. One reason is that this allows light to be easily diffused, and therefore, increases the reflectance of the porous layer 20. Another reason is that this increases the ratio of the fine pores 23 in a unit volume, and therefore, allows the electrophoretic particles 10 to easily transfer through the fine pores 23. Accordingly, contrast is further increased and energy necessary for transferring the electrophoretic particles 10 is further lowered. A nanofiber is a fibrous material that has a fiber diameter from 0.001 µm to 0.1 µm both inclusive and has a length that is 100 times or more of the fiber diameter thereof. The fibrous structure 21 which is a nanofiber is preferably formed by electrostatic spinning since the fibrous structure 21 with a small fiber diameter is formed easily and stably.

The fibrous structure 21 preferably has reflection characteristics different from those of the electrophoretic particles 10. Specifically, the reflection characteristics of the fibrous structure 21 are not particularly limited. However, it is preferable that at least the porous layer 20 as a whole shields the electrophoretic particles 10. One reason is that this causes contrast resulting from difference in reflection characteristics between the electrophoretic particles 10 and the porous layer 20 as described above. Therefore, a fibrous structure 21 that is optically transmissive (colorless and transparent) is not preferable. However, the fibrous structure 21 may have any reflection characteristics in a case where the reflection characteristics of the fibrous structure 21 influences little the reflection characteristics of the porous layer 20, and the reflection characteristics of the porous layer 20 is substantially determined by the reflection characteristics of the non-migrating particles 22.

The average pore diameter of the fine pores 23 is not particularly limited. However, in particular, it is preferable that the average pore diameter of the fine pores 23 be as large as possible since this allows the electrophoretic particles 10 to easily transfer through the fine pores 23. Therefore, the average pore diameter of the fine pores 23 is preferably from 0.01 µm to 10 µm.

The thickness of the porous layer 20 is not particularly limited. To give an example, the thickness of the porous layer 20 may be from 5 µm to 100 µm both inclusive. One reason is that this increases shielding characteristics of the porous layer 20 and allows the electrophoretic particles 10 to easily transfer through the fine pores 23.

The non-migrating particle 22 is held (fixed) by the fibrous structure 21 and is not electrophoretic. A material that forms the non-migrating particle 22 may be, for example, similar to that of the electrophoretic particle 10 and is selected depending on a role of the non-migrating particle 22 as will be described later.

It is to be noted that the non-migrating particle 22 may be partially exposed from the fibrous structure 21, or may be embedded in the fibrous structure 21, as long as the non-migrating particle 22 is held by the fibrous structure 21.

The non-migrating particle 22 has reflection characteristics different from those of the electrophoretic particle 10. The reflection characteristics of the non-migrating particles 22 are not particularly limited. However, it is preferable that at least the porous layer 20 as a whole shields the electrophoretic particles 10. One reason is that this causes contrast by utilizing the difference in reflection characteristics between the electrophoretic particle 10 and the porous layer 20 as described above.

Here, the material forming the non-migrating particle 22 is selected depending on the role of the non-migrating particle 22 to cause contrast. Specifically, the material of the non-migrating particle 22 that performs light display is similar to the material selected for the electrophoretic particle 10 that performs light display. On the other hand, the material of the non-migrating particle 22 that performs dark display is similar to the material selected for the electrophoretic particle 10 that performs dark display. In particular, the material selected for the non-migrating particle 22 that performs light display is preferably a metal oxide since this provides superior chemical stability, superior fixability, and superior optical reflection characteristics. The material forming the non-migrating particles 22 may be the same type as that of the electrophoretic particle 10, or may be different type from that of the electrophoretic particle 10, as long as the non-migrating particle 22 causes contrast.

It is to be noted that a color that is visible when the non-migrating particle 22 performs light display or dark display is similar to the visible color described for the electrophoretic particle 10.

[1-2. Method of Forming Porous Layer]

Figure 3:
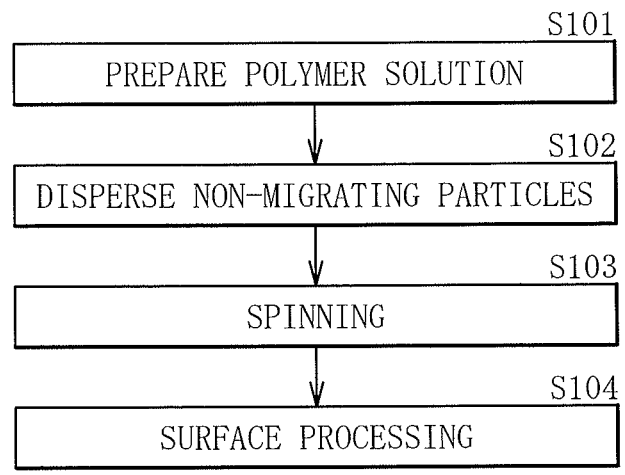
FIG. 3 is a flow chart showing processes of manufacturing the electrophoretic device shown in FIG. 2.

An example of processes of forming the porous layer 20 may be as follows. FIG. 3 is a flow chart of the processes of forming the porous layer 20. First, a polymer material is dissolved in an organic solvent such as N,N'-dimethylformamide (DMF) to prepare a polymer solution as step S101 (preparation of polymer solution). Subsequently, the non-migrating particles 22 (such as titanium oxide) are added to the polymer solution, which is adequately stirred to disperse the non-migrating particles 22 in the polymer solution, as step S102 (dispersion of non-migrating particles). Subsequently, spinning is performed by electrostatic spinning with use of the polymer solution in which the non-migrating particles 22 are dispersed to form the fibrous structure 21, as step S103 (spinning). Subsequently, for example, an aminosilane coupling agent as a coupling agent and the fibrous structure 21 may be, for example, heated at 40° C. to 120° C. both inclusive for 10 minutes to 15 minutes both inclusive, and then, may be, for example, annealed at 60° C. for 10 minutes to 2 hours both inclusive, as step S104 (surface processing). This provides the porous layer 20 that is formed with the fibrous structure 21 that has a surface modified with an amino group.

[Preferable Display Method for Electrophoretic Device]

As described above, in the electrophoretic device 1, the electrophoretic particles 10 and the porous layer 20 (the fibrous structure 21 including the non-migrating particles 22) each perform light display or dark display to cause contrast. In the present embodiment, the electrophoretic particles 10 may perform light display and the porous layer 20 may perform dark display. Alternatively, the electrophoretic particles 10 may perform dark display and the porous layer 20 may perform light display. Such difference in a role is determined depending on a relationship between the reflection characteristics of the electrophoretic particles 10 and the reflection characteristics of the porous layer 20. In other words, reflectance of either of the components that performs light display is higher than that of the other that performs dark display.

In particular, it is preferable that the electrophoretic particles 10 perform dark display and the porous layer 20 performs light display. In accordance therewith, in a case where the reflection characteristics of the porous layer 20 are substantially determined by the reflection characteristics of the non-migrating particles 22, reflectance of the non-migrating particles 22 is preferably higher than that of the electrophoretic particles 10. One reason is that, in this case, reflectance in light display is significantly high since diffusion of light by the porous layer 20 (three-dimensional structure) is utilized and the contrast is significantly high in accordance therewith.

[Operation of Electrophoretic Device]

In the electrophoretic device 1, the reflection characteristics of the electrophoretic particles 10 and the reflection characteristics of the porous layer 20 (the non-migrating particles 22) are different from each other. In this case, when an electric field is applied to the electrophoretic device 1, the electrophoretic particles 10 transfer through the porous layer 20 (the fine pores 23) in a region to which the electric field has been applied. Thus, when the electrophoretic device 1 is seen from a side toward which the electrophoretic particles 10 have transferred, dark display (or light display) is performed by the electrophoretic particles 10 in a region to which the electrophoretic particles 10 have transferred and light display (or dark display) is performed by the porous layer 20 in a region in which the electrophoretic particles 10 have not transferred. This causes contrast.

In an existing electrophoretic device, surface processing is performed on electrophoretic particles so that the electrophoretic particles are charged not to aggregate with one another, and a polymer that has little chemical interaction with these electrophoretic particles is mainly used as the fibrous structure. Specifically, surface processing that provides acceptor characteristics is performed on the electrophoretic particles to set an SP value (Solubility Parameter) of a surface of each of the electrophoretic particles to be in a certain range. A polymer that has weak donor characteristics is used as a material of the fibrous structure. This configuration allows the electrophoretic particles to migrate without being tangled by the fibrous structure. However, this configuration has an issue that the fibrous structure absorbs the electrophoretic particles and a dispersion aid due to the weak donor characteristics thereof, and therefore, display characteristics are lowered.

[Functions and Effects]

On the other hand, according to the present embodiment, the functional group that has a polarity same as that of the electrophoretic particle 10 is introduced to the surface of the fibrous structure 21 that configures the porous layer 20. Thus, the fibrous structure 21 has a polarity same as that of the electrophoretic particle 10. This prevents absorption, by the fibrous structure 21, of the electrophoretic particles 10 that transfer through the fine pores 23 which are formed by the fibrous structure 21. Accordingly, reflection characteristics of the electrophoretic device 1 in light display and dark display are improved and contrast is improved.

[2. Second Embodiment]

Figure 4:
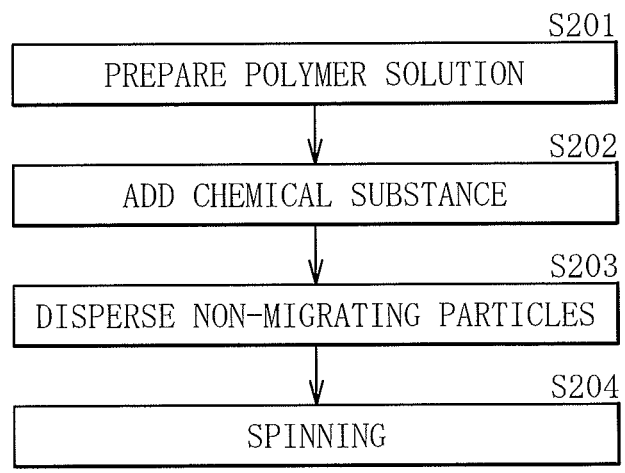
FIG. 4 is a flow chart showing processes of manufacturing a porous layer in a second embodiment of the present application.

FIG. 4 illustrates a flow of processes of forming the porous layer 20 in the electrophoretic device 3 of a second embodiment of the present application. The electrophoretic device 3 of the present embodiment is different from the electrophoretic device 1 of the first embodiment in that the fibrous structure 21 is allowed to have a polarity same as that of the electrophoretic particles 10 by adding a chemical substance that has a polarity same as that of the electrophoretic particles 10 in forming the fibrous structure 21 that configures the porous layer 20. It is to be noted that the same components as those in the above-described first embodiment will be denoted by the same numerals and will not be further described.

The chemical substance added to the fibrous structure 21 is not particularly limited as long as the chemical substance exhibits a polarity same as that of the electrophoretic particles 10 as described above. For example, when the electrophoretic particles 10 are positively charged, it is preferable to use a substance that has an amino group such as N,N-dimethyl-1,3-propyldiamine, 3-aminopropyl trimethylsilane, and n-octylamine. Further, for example, when the electrophoretic particles 10 are negatively charged, it is preferable to use a substance including an epoxy group such as 2-(3,4-epoxycyclohexyl)ethyltrimethoxysilane and 3-glycidoxypropyltrimethoxysilane, or a substance including a carboxylic group such as acetonedicarboxylic acid and adipic acid.

As the procedures of forming the porous layer 20, as shown in FIG. 4, first, a polymer material is dissolved in an organic solvent such as N,N'-dimethylformamide (DMF) to prepare polymer solution, as step S201 (preparation of polymer solution). Next, for example, N,N-dimethyl-1,3-propyldiamine is added thereto, as step S202 (addition of chemical substance). Subsequently, the non-migrating particles 22 (such as titanium oxide) are added to the polymer solution, which is adequately stirred to disperse the non-migrating particles 22 in the polymer solution, as step S203 (dispersion of non-migrating particles and chemical substance). Subsequently, spinning is performed by electrostatic spinning with the use of the polymer solution, in which the non-migrating particles 22 are dispersed, to form the fibrous structure 21, as step S204 (spinning). This provides the porous layer 20 formed with the positively-charged fibrous structure 21.

As described above, in the present embodiment, the porous layer 20 is allowed to have a polarity same as that of the electrophoretic particles 10 by adding the chemical substance to the polymer solution in forming the fibrous structure 21. This provides an effect that simplifies the manufacturing processes in addition to the effect obtained in the above-described first embodiment. Also, this increases the degree of freedom in selecting materials.

[3. Application Example of Electrophoretic Device]

Next, description will be given of an application example of the above-described electrophoretic devices 1 and 3. The electrophoretic devices 1 and 3 are applicable to various electronic apparatuses. The type of the electronic apparatus is not particularly limited. To give an example, the electrophoretic devices 1 and 3 may be applied to a display.

[General Configuration of Display]

Figure 5:
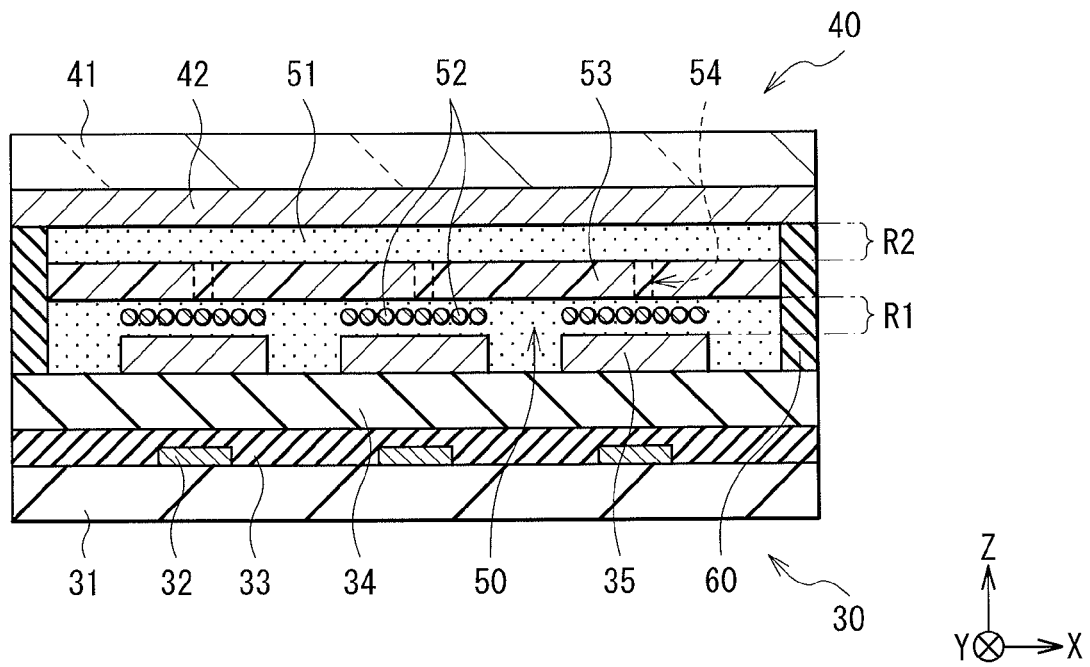
FIG. 5 is a cross-sectional view illustrating a configuration of a display that uses an electrophoretic device according to any one of the first to third embodiments of the present application.
Figure 6:
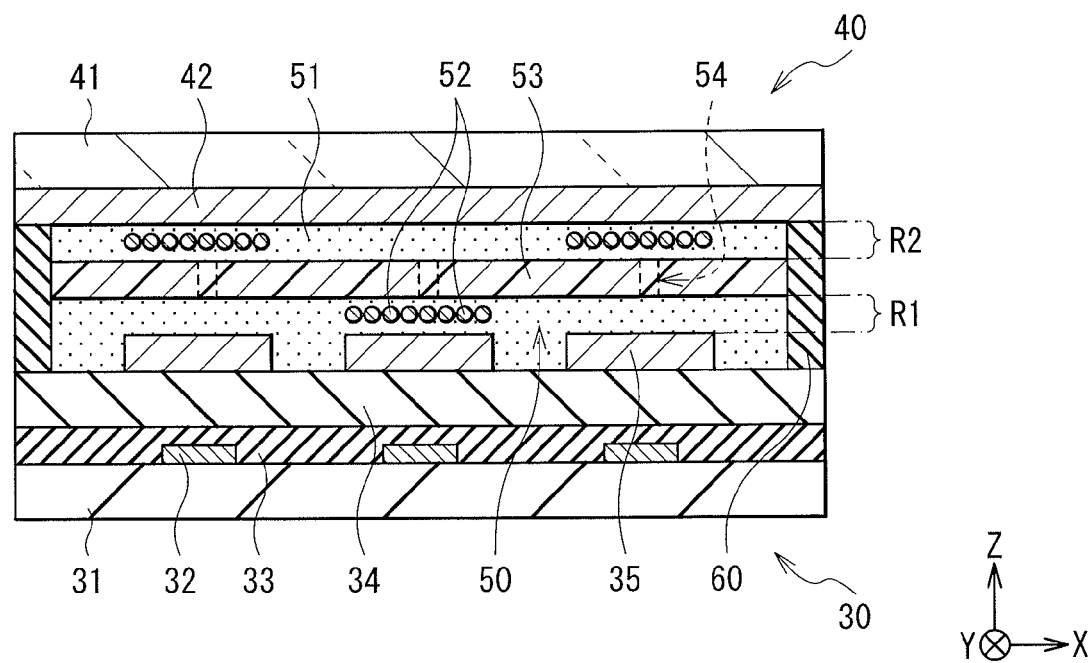
FIG. 6 is a cross-sectional view for explaining operations of the display.

FIG. 5 illustrates a cross-sectional configuration of a display. FIG. 6 is a diagram for explaining operations of the display shown in FIG. 5. It is to be noted that the configuration of the display described below is merely an example, and the configuration thereof may be modified as appropriate.

The display is an electrophoretic display (a so-called electronic paper display) that displays images (such as textual information) by utilizing an electrophoresis phenomenon. The display may include, for example, a drive substrate 30 and an opposed substrate 40 that face each other with an electrophoretic device 50 in between, as illustrated in FIG. 5. The display may display, for example, an image on the opposed substrate 40 side thereof. It is to be noted that the drive substrate 30 and the opposed substrate 40 are separated by a spacer 60 so as to have a predetermined space in between.

[Drive Substrate]

The drive substrate 30 may include, for example, a plurality of thin film transistors (TFTs) 32, a protective layer 33, a planarization insulating layer 34, and a plurality of pixel electrodes 35 formed in this order on a surface of a support base 31. The TFTs 32 and the pixel electrodes 35 are arranged in a matrix or in a segmented state according to an arrangement of pixels.

The support base 31 may be formed of, for example, a material such as an inorganic material, a metal material, and a plastic material. Examples of the inorganic material include silicon (Si), silicon oxide ($SiO_x$), silicon nitride ($SiN_x$), and aluminum oxide ($AlO_x$). Examples of the silicon oxide include glass and spin on glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyethyl ether ketone (PEEK).

The support base 31 may transmit light, or may not transmit light. One reason is that the support base 31 need not be optically transmissive since an image is displayed on the opposed substrate 40 side of the display. Further, the support base 31 may be a substrate that has rigidity such as a wafer, or may be thin-layer glass or a film that has flexibility. In particular, the support base 31 is preferably the latter since a flexible (bendable) display is achieved thereby.

The TFT 32 is a switching element for selecting a pixel. The TFT 32 may be an inorganic TFT that includes an inorganic semiconductor layer as a channel layer, or may be an organic TFT that includes an organic semiconductor layer as a channel layer. The protective layer 33 and the planarization insulating layer 34 may be, for example, formed of an insulating resin material such as polyimide. It is to be noted that, when a surface of the protective layer 33 is sufficiently flat, the planarization insulating layer 34 may not be provided. The pixel electrode 35 may be formed of, for example, a metal material such as gold (Au), silver (Ag), and copper (Cu). The pixel electrode 35 is connected to the TFT 32 through a contact hole (not illustrated) that is provided in the protective layer 33 and the planarization insulating layer 34.

[Opposed Substrate]

The opposed substrate 40 may include, for example, an opposed electrode 42 formed on an entire surface of a support base 41. It is to be noted that the opposed electrode 42 may be arranged in a matrix or in a segmented state in a manner similar to that of the pixel electrodes 35.

The support base 41 is formed of a material similar to that of the support base 31 except that the support base 41 transmits light. One reason is that the support base 41 is optically transmissive since an image is displayed on the opposed substrate 40 side of the display. The opposed electrode 42 is formed of, for example, an optically-transmissive conductive material (transparent electrode material) such as indium-tin-oxide (ITO), antimony-tin-oxide (ATO), fluorine-doped tin oxide (FTO), and aluminum-doped zinc oxide (AZO).

In a case where an image is displayed on the opposed substrate 40 side of the display, the electrophoretic device 50 is seen through the opposed electrode 42. Therefore, it is preferable that optical transmission characteristics (optical transmittance) of the opposed electrode 42 be as high as possible, for example, equal to or higher than 80%. Further, it is preferable that electric resistance of the opposed electrode 42 be as low as possible, for example, equal to or less than 100 Ω/□.

[Electrophoretic Device]

The electrophoretic device 50 has a configuration similar to that of the above-described electrophoretic devices 1 and 3. Specifically, the electrophoretic device 50 includes, in an insulating liquid 51, a plurality of electrophoretic particles 52 and a porous layer 53 that includes a plurality of fine pores 54. The insulating liquid 51 fills a space between the drive substrate 30 and the opposed substrate 40. The porous layer 53 may be, for example, held by the spacer 60. The space filled with the insulating liquid 51 is segmented, by the porous layer 53 as a border, into a remain region R1 closer to the pixel electrodes 35 and a transfer region R2 closer to the opposed electrode 42. Configurations of the insulating liquid 51, the electrophoretic particles 52, and the porous layer 53 are similar to those of the insulating liquid 2, the electrophoretic particles 10, and the porous layer 20, respectively. It is to be noted that FIGS. 5 and 6 only illustrate part of the fine pores 54 for the sake of simplification of illustration.

[Spacer]

The spacer 60 may be formed of, for example, an insulating material such as a polymer material.

A shape of the spacer 60 is not particularly limited. However, in particular, the spacer 60 preferably has a shape that does not prevent transfer of the electrophoretic particles 52 and that allows the electrophoretic particles 52 to be dispersed uniformly, for example, a lattice-like shape. Further, thickness of the spacer 60 is not particularly limited. However, in particular, it is preferable that the spacer 60 be as thin as possible, and may be, for example, 10 μm to 100 μm in order to decrease electric power consumption.

[Operation of Display]

In the display, the plurality of electrophoretic particles 52 are positioned in the remain region R1 in the initial state as shown in FIG. 5. In this case, the electrophoretic particles 52 are shielded by the porous layer 53 in most pixels. Therefore, the electrophoretic device 50 is in a state where contrast is not caused (any image is not displayed) when the electrophoretic device 50 is seen from the opposed substrate 40 side thereof.

When pixels are selected by the TFTs 32 and an electric field is applied between the pixel electrodes 35 and the opposed electrode 42, the electrophoretic particles 52 transfer from the remain region R1 to the transfer region R2 through the porous layer 53 (the fine pores 54) as illustrated in FIG. 6. In this case, pixels in which the electrophoretic particles 52 are shielded by the porous layer 53 and pixels in which the electrophoretic particles 52 are not shielded by the porous layer 53 coexist. Therefore, the electrophoretic device 50 is in a state where contrast is caused when the electrophoretic device 50 is seen from the opposed substrate 40 side thereof. Thus, an image is displayed.

[Functions and Effects of Display]

According to the display, the electrophoretic device 50 has a configuration similar to that of the above-described electrophoretic device 1. Therefore, reflection characteristics of the electrophoretic device 50 in light display and dark display are improved and contrast is improved. Therefore, it is possible to provide a high-grade display with improved display characteristics.

[4. Examples]

Next, description will be given in detail of Examples of the preferred embodiments of the present application.

Example 1

A display was fabricated as follows with use of the electrophoretic particles of black (for dark display) and the porous layer (particle-containing fibrous structure) of white (for light display). It is to be noted that, in Example 1, the porous layer 20 was allowed to have a charge same as that of the electrophoretic particles 10 by modifying the surface of the fibrous structure 21 which configures the porous layer 20 with a functional group.

[Preparation of Electrophoretic Particles]

First, 43 g of sodium hydroxide and 0.37 g of sodium silicate were dissolved in 43 g of water to prepare solution A. Subsequently, 5 g of complex oxide fine particles (Daipyroxide Black 9550 available from Dainichiseika Color & Chemicals Mfg. Co., Ltd.) were added to the solution A, and the resultant was stirred (for 15 minutes), and then, was subjected to ultrasonic stirring (at 30° C. to 35° C. for 15 minutes). Next, the solution A was heated to 90° C., and then, 7.5 cm$^3$ of an aqueous solution in which 15 cm$^3$ of sulfuric acid of 0.22 mol/cm$^3$, 6.5 mg of sodium silicate, and 1.3 mg of sodium hydroxide were dissolved was dropped for 2 hours. Subsequently, the solution A was cooled down (at room temperature), and then, 1.8 cm$^3$ of sulfuric acid of 1 mol/cm$^3$ was added thereto. Next, centrifugation (at 3700 rpm for 30 minutes) and decantation was performed on the solution A and the resultant was dispersed again in ethanol. A combination of centrifugation (at 3500 rpm for 30 minutes) and decantation was performed twice more on the resultant. Subsequently, mixture of 5 cm$^3$ of ethanol and 0.5 cm$^3$ of water was added to each bottle, which was subjected to ultrasonic stirring (for 1 hour). Thus, dispersion solution of silane-coated complex oxide particle was prepared.

Subsequently, the dispersion solution was mixed with solution A in which 3 cm$^3$ of water, 30 cm$^3$ of ethanol, and 4 g of N-[3-(trimethoxysilyl)propyl]-N'-(4-vinylbenzyl)ethylenediamine hydrochloride (40% methanol solution) were mixed and was stirred (for 7 minutes). The solution A was then stirred (for 10 minutes) and centrifugation was performed (at 3500 rpm for 30 minutes) thereon. Subsequently, after decantation, a combination of redispersion in ethanol and centrifugation (at 3500 rpm for 30 minutes) was performed twice as cleaning. Thereafter, the resultant was dried under reduced-pressure environment (at room temperature) for 6 hours, and then, was heated to 70° C. and dried for 2 hours. Next, 50 cm$^3$ of toluene was added to the dried solid of the solution A to prepare solution B, which was stirred in a roll mill (for 12 hours). Subsequently, 0.5 g of acrylic acid and 2.0 g of 2,5-dimethyl-1,5-hexadiene were added to the solution B, which was stirred (for 20 minutes) under nitrogen stream. Further, the solution B was heated to 50° C. and stirred (for 20 minutes), and then, a toluene solution (3 cm$^3$, solution C) in which 0.01 g of AIBN is dissolved was added to the solution B. The resultant was heated to 65° C. and was stirred for 1 hour. Subsequently, the resultant was cooled down to room temperature and ethyl acetate was added thereto, which was subjected to centrifugation (at 3500 rpm for 30 minutes). Subsequently, the resultant was subjected to decantation, and then, to three times of a combination of redispersion in ethyl acetate and centrifugation (at 3500 rpm for 30 minutes) as cleaning, and was dried under reduced-pressure environment (at room temperature) for 12 hours, was heated to 70° C., and dried for 2 hours. Thus, migrating particles (electrophoretic particles 10) of black made of polymer-coated pigment were obtained.

[Preparation of Insulating Liquid]

Next, 0.75% in total of N,N-dimethylpropane-1,3-diamine, 12-hydroxyoctadecanoate, and methoxysulfonil oxymethane (Solsperse 17000 available from The Lubrizol Corporation), 5.0% of sorbitan trioleate, and 94% of isoparaffin (IsoparG available from Exxon Mobil Corportion) which was a primary component were mixed to prepare the insulating liquid. Here, 0.2 g of the migrating particles was added to 9.7 g of the insulating liquid on an as-necessary basis, which was stirred (for 1 hour) in a bead mill to which glass beads (of 0.8 mmφ) were added. Thereafter, the resultant was filtered by a glass-fiber filter to remove the beads. Thus, the insulating liquid in which the migrating particles were dispersed was prepared.

[Preparation of Porous Layer]

Subsequently, as the material forming the fibrous structure 21, 12 g of polyacrylonitrile (available from Sigma-Aldrich Co. LLC., molecular weight of 150000) was dissolved in 88 g of DMF to prepare solution D. Subsequently, for example, 40 g of titanium oxide (TITONE R-42 available from Sakai Chemical Industry Co., Ltd.) as the non-migrating particles 22 was added to the solution D, which was mixed in a bead mill to prepare spinning solution. Subsequently, the spinning solution was put into a syringe, and spinning was performed for 8 strokes with use of an electrospinning machine (NANON available from MECC Co., Ltd.) on a glass substrate on which the pixel electrodes (ITO) of a predetermined pattern were formed. Here, the spinning was performed under conditions of: electric field intensity=28 kV; discharge speed=0.5 cm$^3$/min; spinning distance=15 cm; and scan rate=20 mm/sec. Subsequently, the glass substrate was dried in a vacuum oven (at 75° C.) for 12 hours. Thus, the fibrous structure 21 that included the non-migrating particles 22 was formed.

Subsequently, the fibrous structure 21 formed on the glass substrate was placed in a Teflon container together with the substrate. Another container containing an aminosilane coupling agent (3-aminopropyltriethoxysilane) was placed in the same Teflon container. The Teflon container was placed in an oven at 120° C. (Example 1-1) or at 60° C. (Example 1-2) and retained therein for 12 hours. Thereafter, the substrate was taken out of the Teflon container and was annealed in a hot plate at 60° C. for 2 hours.

[Assembling of Display]

First, unnecessary fibrous structure 21 in a region where the pixel electrode was not formed was removed from the glass substrate on which the pixel electrodes 35 were formed. Thereafter, a PET film (with a thickness of 30 μm) was formed as a spacer on a glass substrate where the opposed electrode 42 (ITO) was formed on the entire surface thereof. The glass substrate on which the pixel electrodes 35 and the fibrous structure 21 were formed was overlaid on this spacer. It is to be noted that a photo-curable resin (photosensitive resin Photolec A-400 available from Sekisui Chemical Co., Ltd.) including beads (with an outer diameter of 30 μm) was used for drawing at position not overlapping the porous layer 20. Lastly, after the insulating liquid in which the electrophoretic particles 10 were dispersed was injected into a gap between the two glass substrates, and the two glass substrates as a whole were pressed with a roller so that the porous layer 20 was spread between the pixel electrodes 35 and the opposed electrode 42. Thereafter, the two glass substrates as a whole were pressed again to be compressed.

Also, a display in which a surface processing was not performed on a fibrous structure was fabricated as a comparative example.

As performance of the displays of Examples 1-1 and 1-2, and of the comparative example, black reflectance (%), white reflectance (%), contrast, and a drive voltage (V) were examined and the results shown in Table 1 were obtained.

In measuring black reflectance and white reflectance, reflectance in a direction of a normal to the substrate with respect to a standard diffuser under a ring illumination at 45° was measured with a spectrophotometer (MCPD-7000 available from Otsuka Electronics Co., Ltd.). In this example, a voltage with which the reflectance became stable in both black display and white display was determined as the drive voltage, and the reflectance in each of the display states was determined as the black reflectance or the white reflectance. The contrast was a value obtained by dividing the white reflectance by the black reflectance.

TABLE 1

|  | Surface treatment temperature (° C.) | Black reflectance (%) | White reflectance (%) | Contrast ratio |
|---|---|---|---|---|
| Example 1-1 | 120 | 3 | 45 | 15 |
| Example 1-2 | 60 | 3 | 30 | 10 |
| Comparative example | — | 3 | 24 | 8 |

Comparing Examples 1-1 and 1-2 with the comparative example, it can be seen that the surface processing on the fibrous structure increased contrast. Further, comparing Example 1-1 with Example 1-2, it can be seen that when the temperature of the surface processing was set to be 120° C., the contrast ratio was improved by 1.5 times.

These results show the following. When a functional group (an amino group in this example) that has a polarity same as that of the electrophoretic particles is introduced to the surface of the fibrous structure, absorption of the electrophoretic particles by the fibrous structure is suppressed due to electric repulsion. This improves white reflectance and also improves contrast ratio. Further, when the temperature of the surface processing is set to be 120° C., the fibrous structure and the coupling agent adequately react with each other to form covalent bonding between the amino group and polyacrylonitrile which is a structure holding fibers. This significantly improves white reflectance and contrast ratio.

It is to be noted that, although the same electrophoretic particles were used and contrast ratio was calculated with black reflectance of 3% in Examples 1-1 and 1-2 and the comparative example in the present Examples for the sake of convenience in comparison, contrast ratio is improved by the embodiments of the present application irrespective of a type of electrophoretic particles. Further, black reflectance is allowed to be less than 3% by selecting electrophoretic particles (for example, by using particles with a particle diameter smaller than that of the electrophoretic particles used in the present Examples). This allows white reflectance and contrast ratio to be improved.

Example 2

Example 2-1

In Example 2, the porous layer 20 was charged to have an electric charge (+) same as that of the electrophoretic particles 10 by adding a chemical substance to a polymer that formed the porous layer 20. In Example 2, a display was fabricated with procedures similar to those of the above-described Example 1 except for the preparation of the insulating liquid and the preparation of the porous layer.

[Preparation of Insulating Liquid]

As the insulating liquid, an organic solvent was prepared that included 1% in total of N,N-dimethylpropane-1,3-diamine, 1,2-hydroxyoctadecanoate, and methoxysulfonil oxymethane (Solsperse 17000 available from The Lubrizol Corporation), 2% of sorbitan monooleate (Span80), and 97% of isoparaffin (IsoparG available from Exxon Mobil Corportion). Here, 0.2 g of the migrating particles was added to 9.7 g of the insulating liquid on an as-necessary basis, which was stirred (for 1 hour) in a bead mill to which glass beads (of 0.8 mm φ) were added. Thereafter, the resultant was filtered by a glass-fiber filter to remove the beads. Thus, the insulating liquid in which the migrating particles were dispersed was prepared.

[Preparation of Porous Layer]

Subsequently, as a material forming the fibrous structure 21, 12 g of polyacrylonitrile (available from Sigma-Aldrich Co. LLC., molecular weight of 150000) and 12 g of N,N-dimethyl-1,3-propyldiamine as a chemical substance to positively charge the porous layer 20 (polyacrylonitrile: N,N-dimethyl-1,3-propyldiamine=1:1 in weight ratio) were dissolved in 88 g of DMF to prepare solution D. Subsequently, for example, 40 g of titanium oxide (TITONE R-42 available from Sakai Chemical Industry Co., Ltd.) as the non-migrating particles 22 was added to 60 g of the solution D, which was mixed in a bead mill to prepare spinning solution. Subsequently, the spinning solution was put into a syringe, and spinning was performed for 8 strokes with use of an electrospinning machine (NANON available from MECC Co., Ltd.) on a glass substrate on which the pixel electrodes (ITO) of a predetermined pattern were formed. Here, the spinning was performed under conditions of: electric field intensity=28 kV; discharge speed=0.5 cm$^3$/min; spinning distance=15 cm; and scan rate=20 mm/sec. Subsequently, the glass substrate was dried in a vacuum oven (at 75° C.) for 12 hours. Thus, the fibrous structure 21 that included the non-migrating particles 22 was formed. Here, the porous layer 20 was positively charged since an amino group was introduced to the surface of the porous layer 20 including pores formed therein by adding N,N-dimethyl-1,3-propyldiamine thereto.

Example 2-2

[Preparation of Porous Layer]

As a material forming the fibrous structure 21, 12 g of polyacrylonitrile (available from Sigma-Aldrich Co. LLC., molecular weight of 150000) and 12 g of 3-aminopropyl trimethoxysilane (KBM-903 available from Shin-Etsu Chemical Co., Ltd.) as a chemical substance to positively charge the porous layer 20 (polyacrylonitrile: 3-aminopropyl trimethoxysilane=1:1 in weight ratio) were dissolved in 88 g of DMF to prepare solution. Further, the thickness of the porous layer 20 was adjusted so that the weighting of titanium oxide (the weight of titanium oxide per unit area) was the same as that in Example 2-1. The porous layer 20 was positively charged since, as Example 2-1 described above, an amino group was introduced to the surface of the porous layer 20 including pores formed therein by adding 3-aminopropyl trimethoxysilane thereto.

Example 2-3

[Preparation of Porous Layer]

As a comparative example, only 12 g of polyacrylonitrile (available from Sigma-Aldrich Co. LLC., molecular weight of 150000) as a material forming the fibrous structure 21 was dissolved in 88 g of DMF without adding any chemical substance to prepare solution. Further, the thickness of the porous layer 20 was adjusted so that the weighting of titanium oxide (the weight of titanium oxide per unit area) was the same as that in Example 2-1. In the present Example, the porous layer 20 was negatively charged since a cyano group derived from polyacrylonitrile was present on the surface of the porous layer 20 by using only polyacrylonitrile as a liquid material of the fibrous structure 21.

Black reflectance (%), white reflectance (%), and contrast were measured for Examples 2-1 to 2-3 in a manner similar to that of the above-described Example 1. Results thereof are shown in Table 2.

TABLE 2

| | Electrophoretic particle | | Porous layer | | Black reflectance (%) | White reflectance (%) | Contrast ratio |
|---|---|---|---|---|---|---|---|
| | Electric charge | Functional group | Electric charge | Functional group | | | |
| Example 2-1 | + | Amino group | + | Amino group | 2 | 52 | 26 |
| Example 2-2 | + | Amino group | + | Amino group | 2 | 50 | 25 |
| Example 2-3 | + | Amino group | − | Cyano group | 4 | 41 | 10 |

It can be said as follows from Table 2. In Example 2-3 (comparative example) to which a chemical substance for allowing the porous layer 20 to have a polarity same as that of the electrophoretic particles was not added, the contrast ratio was 10%. On the other hand, in Examples 2-1 and 2-2, favorable contrast ratio equal to or more than 25% was obtained. One reason for this may be considered that the electrophoretic particles 10 and the porous layer 20 were charged to have the same polarity since a chemical substance for adjusting electric charge was added to the porous layer 20. Moreover, black reflectance, white reflectance, and contrast ratio of Example 2-1 were at levels similar to those of Example 2-2. Therefore, each value of black reflectance, white reflectance, and contrast seems to be independent of a type of the chemical substance for adjusting electric charge.

Accordingly, it may be said that contrast ratio of a display is improved by allowing the charge polarity (polarity) of the electrophoretic particles 10 and that of the porous layer 20 to be the same.

Hereinabove, the present application has been described with reference to the first and the second embodiments. However, the present application is not limited to the examples in the above-described embodiments, and may be variously modified. For example, the electrophoretic device of the present application is not limited to be applied to a display, but may be applied to other electronic apparatuses.

It is possible to achieve at least the following configurations from the above-described example embodiments of the disclosure.

(1) An electrophoretic device including:
  a plurality of electrophoretic particles in an insulating liquid; and
  a porous layer formed of a fibrous structure in the insulating liquid, the fibrous structure having a polarity same as a polarity of the electrophoretic particles.

(2) The electrophoretic device according to (1), wherein the fibrous structure forms a covalent bond with a functional group having a polarity same as the polarity of the electrophoretic particles.

(3) The electrophoretic device according to (1), wherein a chemical substance having a polarity same as the polarity of the electrophoretic particles is added to the fibrous structure.

(4) The electrophoretic device according to any one of (1) to (3), wherein the fibrous structure includes a plurality of non-migrating particles having reflection characteristics different from reflection characteristics of the electrophoretic particles.

(5) The electrophoretic device according to any one of (1) to (4), wherein the fibrous structure is formed of one or more of polymer materials and inorganic materials.

(6) The electrophoretic device according to any one of (1) to (5), wherein the fibrous structure includes a fine pore, the fine pore having an average pore diameter equal to or larger than 0.01 micrometer and equal to or smaller than 10 micrometers.

(7) The electrophoretic device according to any one of (1) to (6), wherein the fibrous structure is formed by electrostatic spinning (8) The electrophoretic device according to any one of (1) to (7), wherein the fibrous structure is a nanofiber.

(9) The electrophoretic device according to any one of (4) to (8), wherein the electrophoretic particles and the non-migrating particles are each formed of one or more of organic pigments, inorganic pigments, dye, carbon materials, metal materials, metal oxides, glass, and polymer materials.

(10) The electrophoretic device according to any one of (4) to (9), wherein the non-migrating particles have reflectance that is higher than reflectance of the electrophoretic particles.

(11) A method of manufacturing an electrophoretic device, the method including:
  forming an electrophoretic particle having a polarity; and
  configuring a porous layer and forming a fibrous structure having a polarity same as the polarity of the electrophoretic particle.

(12) The method of manufacturing an electrophoretic device according to (11), wherein the fibrous structure having the polarity same as the polarity of the electrophoretic particle is formed by introducing a functional group to a fibrous structure, the functional group having a polarity same as the polarity of the electrophoretic particle.

(13) The method of manufacturing an electrophoretic device according to (11), wherein the fibrous structure having the polarity same as the polarity of the electrophoretic particle is formed by adding a chemical substance to a fibrous structure, the chemical substance having a polarity same as the polarity of the electrophoretic particle.

(14) A display including
an electrophoretic device between a pair of bases, one or both of the bases being optically transmissive, and each of the bases including an electrode,
the electrophoretic device including
a plurality of electrophoretic particles in an insulating liquid, and
a porous layer formed of a fibrous structure in the insulating liquid, the fibrous structure having a polarity same as a polarity of the electrophoretic particles.

Hereinafter, a third embodiment of the present application will be described in detail with reference to the drawings. The description will be given in the following order.
5. Third Embodiment
 5-1. General Configuration
 5-2. Method of Forming Porous Layer
6. Application Example
7. Examples

[5. Third Embodiment]
[Electrophoretic Device]

FIG. 1 and FIG. 2 illustrate a plan configuration and a cross-sectional configuration of an electrophoretic device 4 of the third embodiment of the present application, respectively. The electrophoretic device 4 creates contrast by utilizing an electrophoresis phenomenon. The electrophoretic device 4 may be applied to, for example, various electronic apparatuses such as displays. The electrophoretic device 4 includes a plurality of electrophoretic particles 10 having a polarity, and a porous layer 20 in an insulating liquid 2. In the present embodiment, the porous layer 20 includes the fibrous structure 21 and the non-migrating particles 22, and the non-migrating particles 22 are added to in an amount within a predetermined range and dispersed in the fibrous structure 21.

[5-1. General Configuration]
[Insulating Liquid]

The insulating liquid 2 may be, for example, one or more of organic solvents. Specifically, the insulating liquid 2 may be, for example, an organic solvent such as paraffin and isoparaffin. It is preferable that viscosity and refractive index of the insulating liquid 2 be as low as possible. One reason is that this improves mobility (response speed) of the electrophoretic particles 10 and lowers energy (consumed electric power) necessary to transfer the electrophoretic particles 10 accordingly. Another reason is that this enlarges the difference between the refractive index of the insulating liquid 2 and the refractive index of the porous layer 20, and thereby, increases the reflectance of the porous layer 20.

It is to be noted that the insulating liquid 2 may include various materials on an as-necessary basis. Examples of the various materials include colorants, charge-controlling agents, dispersion stabilizers, viscosity modifiers, surfactants and resins.

[Electrophoretic Particle]

The electrophoretic particle 10 is a charged particle that is dispersed in the insulating liquid 2 and is transferable through the fine pores 23 of the porous layer 20 in response to electric-field application. The electrophoretic particle 10 may be configured of, for example, one or more of particles (powder) of materials such as organic pigments, inorganic pigments, dye, carbon materials, metal materials, metal oxides, glass, and polymer materials (resins). Further, the electrophoretic particle 10 may be, for example, a particle such as a pulverized particle and a capsule particle of solid resin that includes the above-described particles. It is to be noted that materials corresponding to the carbon materials, the metal materials, the metal oxides, the glass, and the polymer materials are excluded from materials corresponding to the organic pigments, the inorganic pigments, and the dye.

Examples of the organic pigments include azo-based pigments, metal complex azo-based pigments, polycondensation azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigments include zinc oxide, antimony white, carbon black, iron black, titanium boride, colcothar, mapico yellow, red lead, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include nigrosine-based dye, azo-based dye, phthalocyanine-based dye, quinophthalone-based dye, anthraquinone-based dye, and methine-based dye. Examples of the carbon materials include carbon black. Examples of the metal materials include gold, silver, and copper. Examples of the metal oxides include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer materials include polymer compounds to which a functional group that has a light absorption range in a visible light range is introduced. The type of the polymer compound is not particularly limited as long as the polymer compound has a light absorption range in the visible light range as described above.

A content (concentration) of the electrophoretic particles 10 in the insulating liquid 2 is not particularly limited, however, to give an example, the content thereof may be from 0.1 wt % to 10 wt % both inclusive. One reason is that this secures shielding properties and mobility of the electrophoretic particles 10. In the present embodiment, when the content of the electrophoretic particles 10 is lower than 0.1 wt %, it may be difficult for the electrophoretic particles 10 to shield (hide) the porous layer 20. On the other hand, when the content thereof is higher than 10 wt %, the dispersibility of the electrophoretic particles 10 is lowered. This may make it difficult for the electrophoretic particles 10 to migrate, and may make the electrophoretic particles 10 to aggregate in some cases.

The electrophoretic particles 10 have any reflection characteristics (reflectance) (hereinafter, simply referred to as "reflection characteristics"). The reflection characteristics of the electrophoretic particles 10 are not particularly limited. However, it is preferable that the electrophoretic particles 10 shield at least the porous layer 20. One reason for this is that the difference in reflection characteristics between the electrophoretic particles 10 and the porous layer 20 causes contrast.

Here, a specific material for forming the electrophoretic particles 10 is selected depending on the role of the electrophoretic particles 10 to cause contrast. Specifically, examples of the material used when the electrophoretic particles 10 perform light display include: metal oxides such as titanium oxide, zinc oxide, zirconium oxide, barium titanate, barium sulfide, and potassium titanate; and organic spherical particles such as melamine and benzoguanamine. On the other hand, examples of the material used when the electrophoretic particles 10 perform dark display include carbon materials and metal oxides. Examples of the carbon materials include carbon black. Examples of the metal oxides include copper-chromium oxide, copper-manganese oxide, copper-iron-manganese oxide, copper-chromium-manganese oxide, and copper-iron-chromium oxide. In particular, the carbon materials are preferable since superior chemical stability, superior mobility, and superior optical absorption characteristics are obtained thereby.

When the electrophoretic particles 10 perform light display, the color of the electrophoretic particles 10 that is visible when the electrophoretic device 4 is seen from the outside thereof is not particularly limited as long as contrast is caused thereby. However, in particular, a color close to white is preferable and white is more preferable. On the other hand, when the electrophoretic particles 10 perform dark display, the color of the electrophoretic particles 10 that is visible when the electrophoretic device 4 is seen from the outside thereof is not particularly limited as long as contrast is caused thereby. However, a color close to black is preferable and black is more preferable. One reason for this is that contrast is high in either of the cases.

Further, it is preferable that the electrophoretic particles 10 be easily dispersed and electrically-charged for a long time in the insulating liquid 2, and be difficult to be absorbed by the porous layer 20. Therefore, a dispersant (or an electric-charge modifier) may be used to disperse the electrophoretic particles 10 by electrostatic repulsion, or surface processing may be performed on the electrophoretic particles 10. Also, both of them may be performed.

Examples of the dispersant include Solsperse series available from The Lubrizol Corporation, BYK series and Anti-Terra series available from BYK-Chemie GmbH, and Span series available from ICI Americas Inc.

Examples of the surface processing include rosin processing, surfactant processing, pigment derivative processing, coupling agent processing, graft polymerization processing, and microencapsulation processing. In particular, graft polymerization processing, microencapsulation processing, or a combination thereof is preferable. One reason is that this may provide, for example, dispersion stability for a long time.

A material provided for surface processing may be, for example, a material (absorptive material) that includes a functional group that is absorbable by the surface of the electrophoretic particles 10 and a polymerizable functional group. The type of the absorbable functional group is determined depending on the material for forming the electrophoretic particles 10. To give an example, the absorbable functional group may be an aniline derivative such as 4-vinylaniline with respect to a carbon material such as carbon black, and may be an organosilane derivative such as 3-(trimethoxysilye propyl methacrylate with respect to a metal oxide. Examples of the polymerizable functional group include a vinyl group, an acryl group, and a methacryl group.

Further, the material for surface processing may be, for example, a material (graft material) graftable to the surface of the electrophoretic particles 10 to which a polymerizable functional group is introduced. The graft material preferably includes a polymerizable functional group and a functional group for dispersion that is dispersable into the insulating liquid 2 and is allowed to retain dispersibility by steric hindrance. The type of the polymerizable functional group is similar to those described for the absorptive material. The functional group for dispersion may be, for example, a group such as a branched alkyl group when the insulating liquid 2 is paraffin. For example, a polymeraization initiator such as azobisisobutyronitrile (AIBN) may be used in order to polymerize and graft the graft material.

For reference, the detail of the method of dispersing the electrophoretic particles 10 in the insulating liquid 2 as described above is described in books such as "technology of dispersing ultrafine particles and evaluation thereof~surface processing, pulverizing, and stabilization of dispersion in gas, liquid, and polymer~" (published by Science & technology Co., Ltd.).

[Porous Layer]

The porous layer 20 is a three-dimensional structure formed of the fibrous structure 21, and includes a plurality of fine pores 23 that are formed of this three-dimensional structure. The fibrous structure 21 includes a plurality of non-migrating particles 22. In other words, the non-migrating particles 22 are held by the fibrous structure 21. The porous layer 20 which is a three-dimensional structure may include one fibrous structure 21 that is tangled randomly, or may include a plurality of fibrous structures 21 that are gathered and overlaid randomly. Alternatively, the porous layer 20 may include both. When the plurality of fibrous structures 21 are included, each of the fibrous structures 21 holds one or more non-migrating particles 22. It is to be noted that FIG. 2 illustrates a case in which the porous layer 20 is formed with the plurality of fibrous structures 21.

One reason why the porous layer 20 is a three-dimensional structure formed with the fibrous structure 21 is that light (outside light) is diffused (multiply scattered), and therefore, the reflectance of the porous layer 20 is increased and the thickness of the porous layer 20 is allowed to be thin to obtain the high reflectance. Accordingly, contrast caused by the electrophoretic device 4 is increased and the energy necessary for transferring the electrophoretic particles 10 is lowered. Further, another reason is that the average pore diameter and the number of the fine pores 23 are increased, and therefore, the electrophoretic particles 10 become easy to transfer through the fine pores 23. Accordingly, response speed is increased and the energy necessary to transfer the electrophoretic particles 10 is decreased.

The fibrous structure 21 is a fibrous material that has a length sufficiently large with respect to a fiber diameter thereof The fibrous structure 21 may be, for example, one or more of polymer materials and inorganic materials, or may be other materials. Examples of the polymer materials include nylon, polylactate, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrolidone, polyvinylidene fluoride, poly hexafluoropropylene, cellulose acetate, collagen, gelatin, chitosan, and copolymers thereof Examples of the inorganic materials include titanium oxide. In particular, a polymer material is preferable for a material forming the fibrous structure 21. One reason for this is that the above-described materials have low reactivity (such as optical reactivity), in other words, are chemically stable, and therefore, an unintentional decomposition reaction of the fibrous structure 21 is suppressed. It is to be noted that, when the fibrous structure 21 is formed of a material that has high reactivity, the surface of the fibrous structure 21 is preferably covered with any protective film (not illustrated).

The shape (appearance) of the fibrous structure 21 is not particularly limited as long as the fibrous structure 21 has a length that is sufficiently large with respect to the fiber diameter thereof, as described above. Specifically, the fibrous structure 21 may be linear, may be curled, or may be bent in a point thereof. Also, an extending direction of the fibrous structure 21 is not limited to one direction and the fibrous structure 21 may be branched in one or more directions in points thereof A method of forming the fibrous structure 21 is not particularly limited. To give an example, it is preferable that the fibrous structure 21 be formed by a method such as a phase separation method, a phase inversion method, an electrostatic (electric-field) spinning method, a dissolution spinning method, a wet spinning method, a dry spinning method, a gel spinning method, a sol-gel spinning method, and a spray coating method. One reason is that this allows easy and stable formation of a fibrous material that has a length sufficiently large with respect to the fiber diameter thereof The average fiber diameter of the fibrous structure 21 is not particularly limited. However, it is preferable that the average fiber diameter thereof is as small as possible. One reason is that this allows light to be easily diffused and allows the pore diameter of the fine pore 23 to be larger. It is to be noted that the average fiber diameter may be set to allow the fibrous structure 21 to hold the non-migrating particle 22 described later. Therefore, the average fiber diameter of the fibrous structure 21 is preferably equal to or less than 10 μm. It is to be noted that the lower limit of the average fiber diameter is not particularly limited. To give an example, the lower limit of the average fiber diameter is 0.1 μm, and may be less than 0.1 μm. The average fiber diameter may be measured, for example, by microscope observation with the use of a microscope such as a scanning electron microscope. It is to be noted that the average length of the fibrous structure 21 may be any length.

In particular, the fibrous structure 21 is preferably a nanofiber. One reason is that this allows light to be easily diffused, and therefore, increases the reflectance of the porous layer 20. Another reason is that this increases the ratio of the fine pores 23 in a unit volume, and therefore, allows the electrophoretic particles 10 to easily transfer through the fine pores 23. Accordingly, contrast is further increased and energy necessary for transferring the electrophoretic particles 10 is further lowered. A nanofiber is a fibrous material that has a fiber diameter from 0.001 μm to 0.1 μm both inclusive and has a length that is 100 times or more of the fiber diameter thereof. The fibrous structure 21 which is a nanofiber is preferably formed by electrostatic spinning since the fibrous structure 21 with a small fiber diameter is formed easily and stably.

The fibrous structure 21 preferably has reflection characteristics different from those of the electrophoretic particles 10. Specifically, the reflection characteristics of the fibrous structure 21 are not particularly limited. However, it is preferable that at least the porous layer 20 as a whole shields the electrophoretic particles 10. One reason is that this causes contrast resulting from difference in reflection characteristics between the electrophoretic particles 10 and the porous layer 20 as described above. Therefore, a fibrous structure 21 that is optically transmissive (colorless and transparent) is not preferable. However, the fibrous structure 21 may have any reflection characteristics in a case where the reflection characteristics of the fibrous structure 21 influences little the reflection characteristics of the porous layer 20, and the reflection characteristics of the porous layer 20 is substantially determined by the reflection characteristics of the non-migrating particles 22.

The average pore diameter of the fine pores 23 is not particularly limited. However, in particular, it is preferable that the average pore diameter of the fine pores 23 be as large as possible since this allows the electrophoretic particles 10 to easily transfer through the fine pores 23. Therefore, the average pore diameter of the fine pores 23 is preferably from 0.01 μm to 10 μm.

The thickness of the porous layer 20 is not particularly limited. To give an example, the thickness of the porous layer 20 may be from 5 μm to 100 μm both inclusive. One reason is that this increases shielding characteristics of the porous layer 20 and allows the electrophoretic particles 10 to easily transfer through the fine pores 23.

The non-migrating particle 22 is held (fixed) by the fibrous structure 21 and is not electrophoretic. The fibrous structure 21 includes a plurality of non-migrating particles 22 to allow light to be diffused easier and to further increase contrast of the electrophoretic device 4.

The non-migrating particles 22 in the fibrous structure 21 is preferably added thereto in an amount within a predetermined range and dispersed thereto. It is to be noted that the non-migrating particle 22 may be partially exposed from the fibrous structure 21, or may be embedded in the fibrous structure 21, as long as the non-migrating particle 22 is held by the fibrous structure 21.

Figure 7:
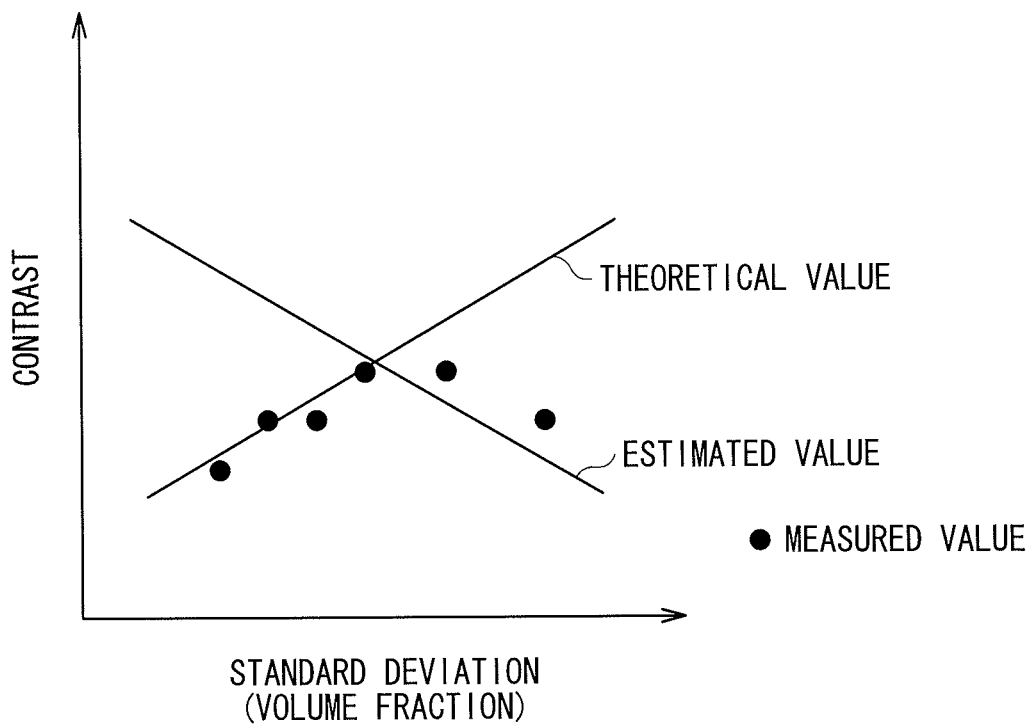
FIG. 7 is a characteristic diagram illustrating a relationship between contrast and standard deviation.

FIG. 7 shows estimated values, theoretical values, and actually-measured values related to a relationship between standard deviation and contrast of the non-migrating particles 22 dispersed in the fibrous structure 21. Generally, it is estimated that contrast is improved when the standard deviation of the non-migrating particles 22 in the fibrous structure 21 is small, namely, when variation in the non-migrating particles 22 is small. Also, it may be considered that optical reflectance is improved by adding a large amount of non-migrating particles 22 to the fibrous structure 21. However, it can be seen that, theoretically, contrast is improved as the standard deviation of the non-migrating particles 22 in the fibrous structure 21 increases. Moreover, it can be seen that, in fact, the amount of variation of the non-migrating particles 22 in the fibrous structure 21 has a limit, and contrast sharply declines when the value of the standard deviation exceeds a certain value.

Figure 8:
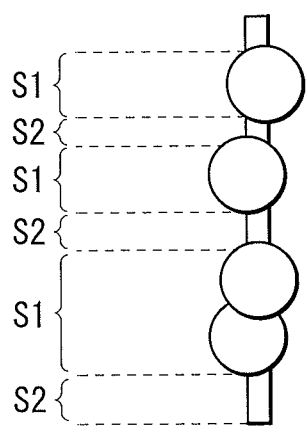
FIG. 8 is a schematic view illustrating a fibrous structure that includes non-migration particles.

One reason for this is that, when the standard deviation of the non-migrating particles 22 included in the fibrous structure 21 is larger than a predetermined value, distance between the non-migrating particles 22 becomes larger and optical reflection efficiency due to the non-migrating particles 22 is lowered. Moreover, when the porous layer 20 is made to be thicker to compensate for the lowered reflectance, pore diameter of the fine pores 23 becomes smaller and energy necessary for transferring the electrophoretic particles 10 increases. On the other hand, another reason may be considered that, when the standard deviation of the non-migrating particles 22 included in the fibrous structure 21 is smaller than a predetermined value, distribution of the non-migrating particles 22 in the porous layer 20 becomes non-uniform due to aggregation of the non-migrating particles 22, and reflectance is lowered. Further, the density of the non-migrating particles 22 in the fibrous structure 21 is improved, and thereby, the fiber diameter of the fibrous structure 21 becomes approximately the same as the particle diameter of the non-migrating particles 22, and the pore diameter of the fine pores 23 becomes smaller. Accordingly, transfer speed of the electrophoretic particles 10 is lowered and energy necessary for the transfer is increased. In other words, it is preferable that the non-migrating particles 22 included in the fibrous structure 21 be added thereto in an amount within a predetermined range and dispersed therein. Specifically, it is preferable that each fibrous structure 21 have a configuration including, in one fibrous structure, one or more regions (first regions S1) in which the non-migrating particles 22 are present and one or more regions (second regions S2) in which the non-migrating particle 22 is not present, as illustrated in FIG. 8.

Specifically, the non-migrating particles 22 added to the fibrous structure 21 in the present embodiment are arranged, for example, so that the standard deviation δ of the fiber diameter of the fibrous structure 21 becomes from 0.1 to 0.3 both inclusive. Further, a ratio of volume in which the non-migrating particle 22 is not present in any fibrous structure 21 is preferably equal to or higher than 10% and equal to or lower than 50% in average. This provides the porous layer 20 in which the optical scattering efficiency due to the non-migrating particles 22 is high.

The non-migrating particles 22 have reflection characteristics different from those of the electrophoretic particles 10. The reflection characteristics of the non-migrating particles 22 are not particularly limited. However, it is preferable that at least the porous layer 20 as a whole shields the electrophoretic particles 10. One reason is that this creates contrast resulting from difference in reflection characteristics between the electrophoretic particles 10 and the porous layer 20. It is to be noted that the optical reflectance of the non-migrating particles 22 is higher than that of the electrophoretic particles 10.

Here, the material for forming the non-migrating particle 22 is selected according to the role of the non-migrating particle 22 to cause contrast. Specifically, the material of the non-migrating particle 22 that performs light display is similar to the material selected for the electrophoretic particle 10 that performs light display. On the other hand, the material of the non-migrating particle 22 that performs dark display is similar to the material selected for the electrophoretic particle 10 that performs dark display. In particular, the material selected for the non-migrating particle 22 that performs light display is preferably a metal oxide since this provides superior chemical stability, superior fixability, and superior optical reflection characteristics. The material for forming the non-migrating particles 22 may be the same type as that of the electrophoretic particle 10, or may be different type from that of the electrophoretic particle 10, as long as the non-migrating particle 22 causes contrast. It is to be noted that a color that is visible when the non-migrating particle 22 performs light display or dark display is similar to the visible color described for the electrophoretic particle 10.

[5-2. Method of Forming Porous Layer]

Figure 9:
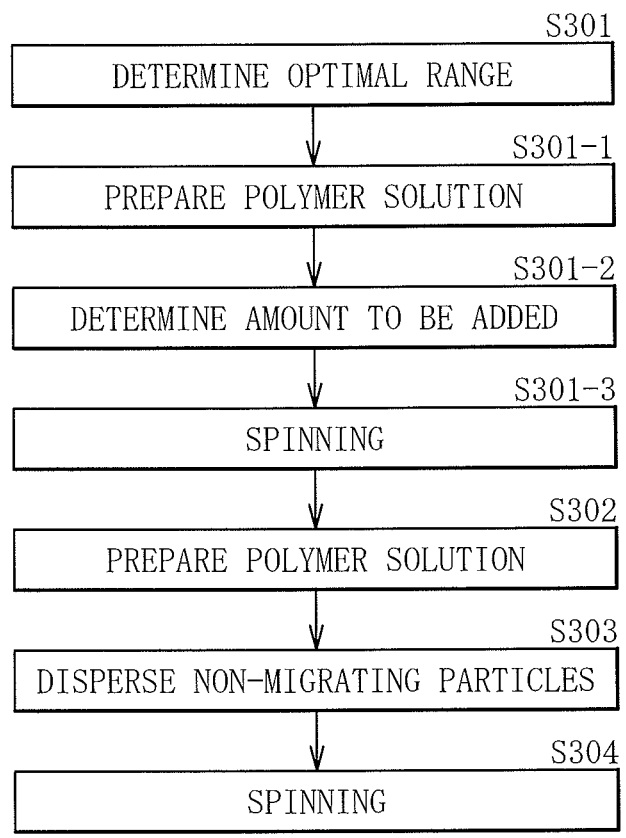
FIG. 9 is a flow chart showing processes of manufacturing the fibrous structure shown in FIG. 8.

An example of processes of forming the porous layer 20 may be as follows. FIG. 9 shows a flow of the processes of forming the porous layer 20. First, an optimal range of the amount of non-migrating particles 22 to be added to and dispersed in the fibrous structure 21 is determined (Step S301). In particular, a polymer solution is prepared in which a polymer material which is a material of the fibrous structure 21 is dissolved in an organic solvent such as N,N'-dimethyl-formamide (DMF) (Step S301-1). Subsequently, the polymer solution is divided into a plurality of groups and, for example, titanium oxide as the non-migrating materials 22 is added to each group of the polymer solution so that the concentration of one dispersion solution is higher than another by 5 wt %. Each dispersion solution is stirred sufficiently to disperse the non-migrating particles 22 in the polymer solution (step S301-2). Subsequently, spinning is performed by electrostatic spinning with use of each prepared dispersion solution to form the fibrous structure 21. Subsequently, optical reflectance of the fibrous structure 21 was measured for each concentration and the optimal range of the amount of non-migrating particles 22 to be added is determined (step S301-3). It is to be noted that the concentration of the non-migrating particles 22 may be examined in smaller range if necessary. Also, examination for each concentration may be appropriately omitted. Thereafter, as in steps S301-1 and S301-2, a polymer solution in which the fiber structure 21 is dispersed is prepared (step S302) and the non-migrating particles 22 of an amount in the optimal range determined in the above-described step S301-3 are added to the polymer solution to prepare dispersion solution (step S303). Subsequently, spinning is performed by electrostatic spinning with use of the polymer solution in which the non-migrating particles 22 are dispersed to form the fibrous structure 21 (step S304). This provides the porous layer 20 that secures the transfer path (fine pore 23) of the electrophoretic particles 10 and has improved light scattering efficiency.

[Preferable Display Method for Electrophoretic Particles]

As described above, in the electrophoretic device 4, the electrophoretic particles 10 and the porous layer 20 (the fibrous structure 21 including the non-migrating particles 22) each perform light display or dark display to cause contrast. In the present embodiment, the electrophoretic particles 10 may perform light display and the porous layer 20 may perform dark display. Alternatively, the electrophoretic particles 10 may perform dark display and the porous layer 20 may perform light display. Such difference in a role is determined depending on a relationship between the reflection characteristics of the electrophoretic particles 10 and the reflection characteristics of the porous layer 20. In other words, reflectance of either of the components that performs light display is higher than that of the other that performs dark display.

In particular, it is preferable that the electrophoretic particles 10 perform dark display and the porous layer 20 perform light display. In accordance therewith, in a case where the reflection characteristics of the porous layer 20 is substantially determined by the reflection characteristics of the non-migrating particles 22, reflectance of the non-migrating particles 22 is preferably higher than that of the electrophoretic particles 10. One reason is that, in this case, reflectance in light display is significantly high since diffusion of light by the porous layer 20 (three-dimensional structure) is utilized and the contrast is significantly high in accordance therewith.

[Operation of Electrophoretic Device]

In the electrophoretic device 4, the reflection characteristics of the electrophoretic particles 10 and the reflection characteristics of the porous layer 20 (the non-migrating particles 22) are different from each other. In this case, when an electric field is applied to the electrophoretic device 4, the electrophoretic particles 10 transfer through the porous layer 20 (the fine pores 23) in a region to which the electric field has been applied. Thus, when the electrophoretic device 4 is seen from a side toward which the electrophoretic particles 10 have transferred, dark display (or light display) is performed by the electrophoretic particles 10 in a region to which the electrophoretic particles 10 have transferred and light display (or dark display) is performed by the porous layer 20 in a region in which the electrophoretic particles 10 has not transferred. This causes contrast.

A method of improving display grade, in particular, contrast and response speed of an electrophoretic display has been searched as described above. One example of such methods may be a method of improving contrast by adding non-migrating particles that have reflection characteristics different from those of the electrophoretic particles that perform dark display (or light display) to a fibrous structure that configures the porous layer performing light display (or dark display), as in the present embodiment. This increases contrast and increases response speed of the electrophoretic particles compared to the existing electrophoretic device.

However, contrast ratio is not improved as expected from the optical reflectance of the non-migrating particles (refer to the estimated values in FIG. 7) in the electrophoretic device in which the optical reflectance of the fibrous structure is improved by adding the non-migrating particles to improve contrast of the porous layer and the electrophoretic particles.

On the other hand, in the present embodiment, a dispersed state of the non-migrating particles 22 in the fibrous structure 21 and optical reflectance are measured in advance with respect to the amount of the non-migrating particles 22 added to the fibrous structure 21. As a result, it can be seen that the optical reflectance of the fibrous structure 21 is improved as the amount of the added non-migrating particles 22 is increased up to a certain ratio, but the optical reflectance sharply decreases when the amount of the added non-migrating particles 22 becomes larger than a certain ratio, as shown in FIG. 7. In other words, it can be seen that the amount of non-migrating particles 22 added to the fibrous structure 21 has an optimal range.

[Functions and Effects]

Accordingly, in the present embodiment, the optimal range of the amount of the non-migrating particles 22 added to the fibrous structure 21 is measured in advance, and the non-migrating particles 22 are added to in an amount within a predetermined range and dispersed in the fibrous structure 21 that configures the porous layer 20, according to the optimal range. Thus, the transfer path of the electrophoretic particles 10 is secured and the light scattering efficiency due to the non-migrating particles 22 is improved. Therefore, response speed is improved and contrast is improved. Further, a high-grade display with improved display characteristics is provided.

Moreover, response speed is improved as described above, and therefore, electric power consumption is decreased.

[6. Application Example of Electrophoretic Device]

Next, description will be given of an application example of the above-described electrophoretic device 4. The electrophoretic device 4 is applicable to various electronic apparatuses. The type of the electronic apparatus is not particularly limited. To give an example, the electrophoretic device 4 may be applied to a display.

[General Configuration of Display]

FIG. 5 illustrates a cross-sectional configuration of a display. FIG. 6 is a diagram for explaining operations of the display shown in FIG. 5. It is to be noted that the configuration of the display described below is merely an example. Therefore, the configuration thereof may be modified as appropriate.

The display is an electrophoretic display (a so-called electronic paper display) that displays images (such as textual information) by utilizing an electrophoresis phenomenon. The display may include, for example, a drive substrate 30 and an opposed substrate 40 that face each other with an electrophoretic device 50 in between, as illustrated in FIG. 5. The display may display, for example, an image on the opposed substrate 40 side thereof. It is to be noted that the drive substrate 30 and the opposed substrate 40 are separated by a spacer 60 so as to have a predetermined space in between.

[Drive Substrate]

The drive substrate 30 may include, for example, a plurality of thin film transistors (TFTs) 32, a protective layer 33, a planarization insulating layer 34, and a plurality of pixel electrodes 35 formed in this order on a surface of a support base 31. The TFTs 32 and the pixel electrodes 35 are arranged in a matrix or in a segmented stated according to an arrangement of pixels.

The support base 31 may be formed of, for example, a material such as an inorganic material, a metal material, and a plastic material. Examples of the inorganic material include silicon (Si), silicon oxide ($SiO_x$), silicon nitride ($SiN_x$), and aluminum oxide ($AlO_x$). Examples of the silicon oxide include glass and spin on glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyethyl ether ketone (PEEK).

The support base 31 may transmit light, or may not transmit light. One reason is that the support base 31 need not be optically transmissive since an image is displayed on the opposed substrate 40 side of the display. Further, the support base 31 may be a substrate that has rigidity such as a wafer, or may be thin-layer glass or a film that has flexibility. In particular, the support base 31 is preferably the latter since a flexible (bendable) display is achieved thereby.

The TFT 32 is a switching element for selecting a pixel. The TFT 32 may be an inorganic TFT that includes an inorganic semiconductor layer as a channel layer, or may be an organic TFT that includes an organic semiconductor layer as a channel layer. The protective layer 33 and the planarization insulating layer 34 may be, for example, formed of an insulating resin material such as polyimide. It is to be noted that, when a surface of the protective layer 33 is sufficiently flat, the planarization insulating layer 34 may not be provided. The pixel electrode 35 may be formed of, for example, a metal material such as gold (Au), silver (Ag), and copper (Cu). The pixel electrode 35 is connected to the TFT 32 through a contact hole (not illustrated) that is provided in the protective layer 33 and the planarization insulating layer 34.

[Opposed Substrate]

The opposed substrate 40 may include, for example, a opposed electrode 42 formed on an entire surface of a support base 41. It is to be noted that the opposed electrode 42 may be arranged in a matrix or in a segmented state in a manner similar to that of the pixel electrodes 35.

The support base 41 is formed of a material similar to that of the support base 31 except that the support base 41 transmits light. One reason is that the support base 41 is optically transmissive since an image is displayed on the opposed substrate 40 side of the display. The opposed electrode 42 is formed of, for example, an optically-transmissive conductive material (transparent electrode material) such as indium-tin-oxide (ITO), antimony-tin-oxide (ATO), fluorine-doped tin oxide (FTO), and aluminum-doped zinc oxide (AZO).

In a case where an image is displayed on the opposed substrate 40 side of the display, the electrophoretic device 50 is seen through the opposed electrode 42. Therefore, it is preferable that optical transmission characteristics (optical transmittance) of the opposed electrode 42 be as high as possible, for example, equal to or higher than 80%. Further, it is preferable that electric resistance of the opposed electrode 42 be as low as possible, for example, equal to or less than 100 $\Omega/\square$.

[Electrophoretic Device]

The electrophoretic device 50 has a configuration similar to that of the above-described electrophoretic device 4. Specifically, the electrophoretic device 50 includes, in an insulating liquid 51, a plurality of electrophoretic particles 52 and a porous layer 53 that includes a plurality of fine pores 54. The insulating liquid 51 fills a space between the drive substrate 30 and the opposed substrate 40. The porous layer 53 may be, for example, held by the spacer 60. The space filled with the insulating liquid 51 is segmented, by the porous layer 53 as a border, into a remain region R1 closer to the pixel electrodes 35 and a transfer region R2 closer to the opposed electrode 42. Configurations of the insulating liquid 51, the electrophoretic particles 52, and the porous layer 53 are similar to those of the insulating liquid 2, the electrophoretic particles 10, and the porous layer 20, respectively. It is to be noted that FIGS. 5 and 6 only illustrate part of the fine pores 54 for the sake of simplification of illustration.

[Spacer]

The spacer 60 may be formed of, for example, an insulating material such as a polymer material.

A shape of the spacer 60 is not particularly limited. However, in particular, the spacer 60 preferably has a shape that does not prevent transfer of the electrophoretic particles 52 and that allows the electrophoretic particles 52 to be dispersed uniformly, for example, a lattice-like shape. Further, thickness of the spacer 60 is not particularly limited. However, in particular, it is preferable that the spacer 60 be as thin as possible, and may be, for example, 10 μm to 100 μm in order to decrease electric power consumption.

[Operation of Display]

In the present display, the plurality of electrophoretic particles 52 are positioned in the remain region R1 in the initial state as shown in FIG. 5. In this case, the electrophoretic particles 52 are shielded by the porous layer 53 in most pixels. Therefore, the electrophoretic device 50 is in a state where contrast is not caused (any image is not displayed) when the electrophoretic device 50 is seen from the opposed substrate 40 side thereof.

When pixels are selected by the TFTs 32 and an electric field is applied between the pixel electrodes 35 and the opposed electrode 42, the electrophoretic particles 52 transfer from the remain region R1 to the transfer region R2 through the porous layer 53 (the fine pores 54) as illustrated in FIG. 6. In this case, pixels in which the electrophoretic particles 52 are shielded by the porous layer 53 and pixels in which the electrophoretic particles 52 are not shielded by the porous layer 53 coexist. Therefore, the electrophoretic device 50 is in a state where contrast is caused when the electrophoretic device 50 is seen from the opposed substrate 40 side thereof. Thus, an image is displayed.

[Functions and Effects of Display]

According to the present display, the electrophoretic device 50 has a configuration similar to that of the above-described electrophoretic device 4. Therefore, high contrast, high-speed response, and low power consumption are achievable. Therefore, a high-grade image is displayed with low power consumption.

[7. Examples]

Next, description will be given in detail of Examples of the present embodiment of the present application.

EXAMPLES 3 and 4

A display was fabricated as follows with use of the electrophoretic particles of black (for dark display) and the porous layer (particle-containing fibrous structure) of white (for light display). [Preparation of Migrating Particles]

First, 43 g of sodium hydroxide and 0.37 g of sodium silicate were dissolved in 43 g of water to prepare solution A. Subsequently, 5 g of complex oxide fine particles (Daipyroxide Black 9550 available from Dainichiseika Color & Chemicals Mfg. Co., Ltd.) was added to the solution A while the solution A being stirred, and the resultant was stirred (for 15 minutes), and then, was subjected to ultrasonic stirring (at 30° C. to 35° C. for 15 minutes). Next, the solution A was heated (to 90° C.), and then, 7.5 cm$^3$ of an aqueous solution in which 15 cm$^3$ (=ml) of sulfuric acid of 0.22 mol/cm$^3$, 6.5 mg of sodium silicate, and 1.3 mg of sodium hydroxide were dissolved was dropped for 2 hours. Subsequently, the solution A was cooled down (at room temperature), and then, 1.8 cm$^3$ of sulfuric acid of 1 mol/cm$^3$ was added to the solution A. Thereafter, centrifugation (at 3700 rpm for 30 minutes) and decantation were performed on the solution A. Next, the resultant was dispersed again to ethanol, and a combination of centrifugation (at 3500 rpm for 30 minutes) and decantation was repeated twice on the resultant. Subsequently, mixture of 5 cm$^3$ of ethanol and 0.5 cm$^3$ of water was added to each bottle, which was subjected to ultrasonic stirring (for 1 hour). Thus, dispersion solution of silane-coated complex oxide particle was obtained.

Subsequently, 3 cm$^3$ of water, 30 cm$^3$ of ethanol, and 4 g of N-[3-(trimethoxysilyl)propyl]-N'-(4-vinylbenzyl)ethylene-diamine hydrochloride (40% methanol solution) were mixed and stirred (for 7 minutes) and all of the dispersion solution was poured therein. Subsequently, the mixture solution was stirred (for 10 minutes) and centrifugation was performed (at 3500 rpm for 30 minutes) thereon. Subsequently, after decantation, the resultant was subjected twice to a combination of redispersion in ethanol and centrifugation (at 3500 rpm for 30 minutes) as cleaning. After decantation, the resultant was dried (for 6 hours) under reduced-pressure environment (at room temperature), and then, was dried (for 2 hours) under reduced-pressure environment (at 70° C.) to obtain a solid material. Next, 50 cm$^3$ of toluene was added to the solid material to prepare solution B, which was stirred in a roll mill (for 12 hours). Subsequently, the solution B was put in a three-necked flask and 0.5 g of acrylic acid and 2.0 g of 2,5-dimethyl-1,5-hexadiene were added thereto, which was stirred (for 20 minutes) under nitrogen stream. Next, the solution B was further stirred (at 50° C. for 20 minutes). Solution C in which 0.01 g of AIBN is dissolved in 3 cm$^3$ of toluene was added to the solution B and the resultant was heated (to 65° C.). Subsequently, the mixture solution was stirred (for 1 hour), cooled down (at room temperature) and poured into a bottle with ethyl acetate. The resultant was subjected to centrifugation (at 3500 rpm for 30 minutes). Subsequently, the resultant was subjected to decantation, and then, was subjected to three times of combination of redispersion to ethyl acetate and centrifugation (at 3500 rpm for 30 minutes) as cleaning. The resultant was dried (for 12 hours) under reduced-pressure environment (at room temperature), and was further dried (for 2 hours) under reduced-pressure environment (at 70° C.). Thus, migrating particles of black made of polymer-coated pigment were obtained.

[Preparation of Insulating Liquid]

Next, as the insulating liquid, an organic solvent was prepared that includes 0.75% of methoxysulfonil oxymethane (Solsperse 17000 available from The Lubrizol Corporation), 5.0% of sorbitan trioleate (Span85), and 94% of isoparaffin (IsoparG available from Exxon Mobil Corportion) which is a primary component. Here, 0.2 g of the migrating particles was added to 9.7 g of the insulating liquid as necessary, which was stirred (for 1 hour) in a bead mill to which glass beads (of 0.8 mmφ) were added. Thereafter, the mixture solution was filtered by a glass-fiber filter to remove the beads. Thus, the insulating liquid in which the migrating particles are dispersed was obtained.

[Preparation of Porous Layer]

Subsequently, 12 g of polyacrylonitrile (available from Sigma-Aldrich Co. LLC., molecular weight of 150000) as the material for forming the fibrous structure 21 was dissolved in 88 g of DMF to prepare solution D. Subsequently, for example, 45 g of titanium oxide (TITONE R-42 available from Sakai Chemical Industry Co., Ltd.) which was the non-migrating particles 22 was added to 55 g of the solution D and mixed in a bead mill to prepare spinning solution. The concentration of titanium oxide at this time was described as d wt %. Subsequently, the spinning solution was put into a syringe, and spinning was performed for 8 strokes with use of an electrospinning machine (NANON available from MECC Co., Ltd.) on a glass substrate on which the pixel electrodes (ITO) of a predetermined pattern were formed. The spinning was performed under conditions of: electric field intensity=28 kV; discharge speed=0.5 cm³/min; spinning distance=15 cm; and scan rate=20 mm/sec. Subsequently, the glass substrate was dried in a vacuum oven (at 75° C.) for 12 hours. Thus, the fibrous structure 21 that includes the non-migrating particles 22 was formed. It is to be noted that, in Examples 3-2 to 3-7, spinning solution with d of 40, 35, 30, 25, 20, and 15 was prepared and a fibrous structure 21 was formed in a similar manner. In Example 4, melamine-formaldehyde spherical particles were used as the migrating particles instead of titanium oxide. Spinning solution was fabricated to have d of 50, 30, 25, and 10 to form a fibrous structure 21.

[Assembling of Display]

First, unnecessary fibrous structure 21 in a region in which the pixel electrode was not formed was removed from the glass substrate on which the pixel electrodes 35 were formed. Thereafter, a PET film (with a thickness of 30 µm) was formed as a spacer on a glass substrate where the opposed electrode 42 (ITO) was formed on the entire surface thereof. The glass substrate on which the pixel electrodes 35 and the fibrous structure 21 were formed was overlaid on this spacer. It is to be noted that a photo-curable resin (photosensitive resin Photolec A-400 available from Sekisui Chemical Co., Ltd.) including beads (with an outer diameter of 30 µm) was used for drawing at position not overlapping the porous layer. Lastly, after the insulating liquid in which the migrating particles were dispersed was injected into a gap between the two glass substrates, the two glass substrates as a whole were pressed with a roller to allow the porous layer 20 to be adjacent to the pixel electrodes 35 and the opposed electrode 42. Thereafter, the glass substrates as a whole were pressed again to compress the porous layer 20.

As performance of the displays of Examples 3 and 4, black reflectance (%), white reflectance (%), contrast, and response speed (ms) were examined. Results shown in Tables 3 and 4 were obtained.

In measuring black reflectance and white reflectance, after alternating-current voltage (of 0.1 Hz and 15V) was applied to the display for 1 hour, reflectance in a direction of a normal to the substrate with respect to a standard diffuser under a ring illumination at 45° was measured with a spectrophotometer (eye-one pro available from X-Rite, Incorporated.). Contrast ratio (CR) was a value obtained by dividing the white reflectance by the black reflectance. Luminance was measured by applying a rectangular-wave electric field (of 15V) with use of a function generator (available from Toyo Corporation). The response speed was an average value of time necessary for luminance to vary from 0.1 to 0.9 when an electric field was applied and time necessary for luminance to vary from 0.9 to 0.1 when the application of the electric field was stopped when luminance of white was 1 and luminance of black was 0.

Further, in Examples 3 and 4, the standard deviation δ of the non-migrating particles in any fibrous structure and volume fraction v (%) of a portion not including the non-migrating particles in any fibrous structure were calculated. The standard deviation δ was calculated by preparing the fibrous structure, and then, measuring the fiber diameter thereof with use of a scanning electron microscope. More specifically, a fiber diameter Xi of any fibrous structure (with a fiber length of 10 µm) was measured per length of 100 nm, and the standard deviation δ was calculated with use of the following expressions (1) and (2). It is to be noted that $\bar{x}$ is an average value of the measured values. Further, the volume fraction v was calculated when the average fiber diameter was 1 µm or less.

$$\bar{x} = \frac{1}{n}\sum_{i=1}^{n} x_i \qquad (1)$$

$$\delta = \sqrt{\frac{1}{n}\sum_{i=1}^{n}(x_i - \bar{x})^2} \qquad (2)$$

TABLE 3

| | Concentration d of non-migrating particles in solution D (wt %) | Standard deviation δ | Volume fraction (%) | White reflectance (%) | Black reflectance (%) | CR | Average response speed (ms) |
|---|---|---|---|---|---|---|---|
| Example 3-1 | 45 | 0.01 | 1 | 27 | 5.2 | 5 | 700 |
| Example 3-2 | 40 | 0.07 | 5 | 28 | 3.2 | 9 | 650 |
| Example 3-3 | 35 | 0.1 | 10 | 43 | 1.1 | 39 | 600 |
| Example 3-4 | 30 | 0.19 | 34 | 42 | 1.1 | 38 | 600 |
| Example 3-5 | 25 | 0.25 | 40 | 42 | 1.1 | 38 | 550 |
| Example 3-6 | 20 | 0.3 | 50 | 40 | 1.8 | 22 | 550 |
| Example 3-7 | 15 | 0.36 | 74 | 32 | 2.5 | 13 | 500 |

TABLE 4

| | Concentration d of non-migrating particles in solution D (wt %) | Standard deviation δ | Volume fraction (%) | White reflectance (%) | Black reflectance (%) | CR | Average response speed (ms) |
|---|---|---|---|---|---|---|---|
| Example 4-1 | 50 | 0.08 | 0 | 11 | 3 | 4 | 1000 |
| Example 4-2 | 30 | 0.16 | 10 | 15 | 0.7 | 21 | 800 |
| Example 4-3 | 25 | 0.15 | 15 | 15 | 1 | 15 | 750 |
| Example 4-4 | 10 | 0.46 | 85 | 7 | 2 | 4 | 600 |

It can be seen from Table 3 that high contrast ratio of 20 or higher was maintained in Examples 3-3 to 3-6, but the contrast ratio was decreased to the 10% level or less in Examples 3-1, 3-2, and 3-7. It may be considered that one reason for this is that, in Examples such as Examples 3-1 and 3-2 in which the standard deviation was small (0.01 or 0.07) and the volume fraction of the space in which the non-migrating particle was not present was small (1% or 5%), effective light scattering due to the non-migrating particles was not obtained. Further, the average response speed was decreased since the three-dimensional fine pore in the fibrous structure also became smaller. It may be considered that another reason is that, in Examples such as Examples 3-7 in which the standard deviation was large (0.36) and the volume fraction was large (74%), the non-migrating particles were present with a space therebetween in the fibrous structure, but the absolute amount of the non-migrating particles was small and large masses on the fiber occurred, namely, an aggregation phenomenon occurred. Accordingly, optical scattering efficiency was lowered and contrast was lowered. Further, average response speed may be apparently faster, but the average response speed did not become faster in fact since contrast was low.

It can be seen from Table 4 that, in Examples 4-2 and 4-3, high contrast ratio of 10 or higher was maintained, but, in Examples 4-1 and 4-4, contrast ratio was decreased to 5% or lower. It may be considered that one reason for this is, as in Example 3, low optical scattering efficiency due to the non-migrating particles in Example 4-1, and is small amount of the non-migrating particles and aggregation thereof in Example 4-4.

As described above, it can be seen that the non-migrating particles in the fibrous structure has a favorable dispersion ratio (optimal range) with respect to reflectance and response speed. In particular, it can be seen that standard deviation is preferably equal to or larger than 0.1 and equal to or smaller than 0.3. Further, volume fraction (ratio of volume not including the non-migrating particles in the fibrous structure) is preferably equal to or higher than 10% and equal to or lower than 50%.

Contrast is further improved when 1. First Embodiment, 1-1. General Configuration, 1-2. Method of Forming Porous Layer, 2. Second Embodiment, 3. Application Example, and 4. Examples, together with 5. Third Embodiment, 5-1. General Configuration, 5-2. Method of Forming Porous Layer, 6. Application Example, and 7. Examples.

The present application has been described hereinabove referring to the preferred embodiments. However, the present application is not limited to those described in the preferred embodiments and may be variously modified. For example, the electrophoretic device of the present application is not limitedly applied to a display, but may be applied to other electronic apparatuses.

It is possible to achieve at least the following configurations from the above-described example embodiments of the disclosure.

(1) An electrophoretic device including:
  a plurality of electrophoretic particles in an insulating liquid; and
  a porous layer formed of a fibrous structure in the insulating liquid, the fibrous structure including a plurality of non-migrating particles, and the non-migrating particles being added to in an amount within a predetermined range and dispersed in the fibrous structure.

(2) The electrophoretic device according to (1), wherein the non-migrating particles are arranged to allow standard deviation of fiber diameter of the fibrous structure to be equal to or larger than 0.1 and equal to or smaller than 0.3.

(3) The electrophoretic device according to (1) or (2), wherein absence ratio of the non-migrating particles in the fibrous structure is equal to or higher than 10% and equal to or lower than 50%.

(4) The electrophoretic device according to any one of (1) to (3), wherein fiber diameter of the fibrous structure is equal to or larger than 50 nanometers and equal to or smaller than 2000 nanometers.

(5) The electrophoretic device according to any one of (1) to (4), wherein the fibrous structure is formed of one or more of polymer materials and inorganic materials.

(6) The electrophoretic device according to any one of (1) to (5), wherein average fiber diameter of the fibrous structure is equal to or larger than 0.1 micrometer and equal to or smaller than 10 micrometers.

(7) The electrophoretic device according to any one of (1) to (6), wherein the fibrous structure is formed by electrostatic spinning (8) The electrophoretic device according to any one of (1) to (7), wherein the non-migrating particles have optical reflection characteristics that are different from optical reflection characteristics of the electrophoretic particles.

(9) The electrophoretic device according to any one of (1) to (8), wherein the non-migrating particles are formed of one or more of organic pigments, inorganic pigments, dye, carbon materials, metal materials, metal oxides, glass, and polymer materials.

(10) The electrophoretic device according to any one of (1) to (9), wherein the non-migrating particles include titanium oxide.

(11) The electrophoretic device according to any one of (1) to (10), wherein the non-migrating particles have reflectance higher than reflectance of the electrophoretic particles.

(12) A method of manufacturing an electrophoretic device, the method including:
  determining an optimal range of an amount of non-migrating particles added to and mixed in a fibrous structure; and
  adding the non-migrating particles having an amount within the optimal range to the fibrous structure and dispersing the added non-migrating particles in the fibrous structure.

(13) The method of manufacturing an electrophoretic device according to (12), wherein the optimal range is determined by measuring a distribution state of optical reflectance with respect to content rate of the non-migrating particles in the fibrous structure.

(14) A display including
  an electrophoretic device between a pair of bases, one or both of the bases being optically transmissive, and each of the bases including an electrode,
  the electrophoretic device including
  a plurality of electrophoretic particles in an insulating liquid, and
  a porous layer formed of a fibrous structure in the insulating liquid, the fibrous structure including a plurality of non-migrating particles, the non-migrating particles having reflection characteristics different from reflection characteristics of the electrophoretic particles, and the non-migrating particles being added to in an amount within a predetermined range and dispersed in the fibrous structure.

It should be understood that various changes and modifications to the presently preferred embodiments described herein will be apparent to those skilled in the art. Such changes and modifications can be made without departing from the spirit and scope of the present subject matter and The invention is claimed as follows:

1. An electrophoretic device comprising:
   a plurality of electrophoretic particles in an insulating liquid;
   a porous layer formed of a fibrous structure in the insulating liquid, wherein the fibrous structure has a same polarity as a polarity of the electrophoretic particles regardless of migration direction of the electrophoretic particles passing through the fibrous structure, and wherein the polarity of the fibrous structure is unvarying.

2. The electrophoretic device according to claim 1, wherein a surface of the fibrous structure is modified with a functional group having a same polarity as the polarity of the electrophoretic particles.

3. The electrophoretic device according to claim 1, wherein the fibrous structure comprises a chemical substance having a same polarity as the polarity of the electrophoretic particles.

4. The electrophoretic device according to claim 1, wherein the fibrous structure includes a plurality of non-migrating particles having reflection characteristics different from reflection characteristics of the electrophoretic particles.

5. The electrophoretic device according to claim 1, wherein the fibrous structure is formed of one or more of polymer materials or inorganic materials.

6. The electrophoretic device according to claim 1, wherein the fibrous structure includes a fine pore, the fine pore having an average pore diameter equal to or larger than 0.01 micrometer and equal to or smaller than 10 micrometers.

7. The electrophoretic device according to claim 1, wherein the fibrous structure is formed by electrostatic spinning.

8. The electrophoretic device according to claim 1, wherein the fibrous structure is a nanofiber.

9. The electrophoretic device according to claim 4, wherein the electrophoretic particles and the non-migrating particles are each formed of one or more of organic pigments, inorganic pigments, dye, carbon materials, metal materials, metal oxides, glass, or polymer materials.

10. The electrophoretic device according to claim 4, wherein the non-migrating particles have a higher reflectance than the electrophoretic particles.

11. The electrophoretic device according to claim 2, wherein the functional group is covalently bonded to the surface of the fibrous structure.

12. The electrophoretic device according to claim 2, wherein the functional group is at least one selected from the group consisting of: an amino group, an imino group, an amide group, a silicon atom, a titanium atom, an aluminum atom, siloxane, titanate, and aluminate.

13. The electrophoretic device according to claim 1, wherein the insulating liquid comprises an organic solvent.

14. The electrophoretic device according to claim 1, wherein the porous layer has a thickness of about 5 μm to about 100 μm.

15. A method of manufacturing an electrophoretic device, the method comprising:
   forming an electrophoretic particle having a first polarity;
   providing a porous layer comprising a fibrous structure that has a same polarity as the first polarity of the electrophoretic particle regardless of migration direction of the electrophoretic particles passing through the fibrous structure and wherein the polarity of the fibrous structure is unvarying.

16. The method of manufacturing an electrophoretic device according to claim 15, wherein the fibrous structure having the same polarity as the first polarity of the electrophoretic particle is formed by introducing a functional group to a surface of the fibrous structure, the functional group having a same polarity as the first polarity of the electrophoretic particle.

17. The method of manufacturing an electrophoretic device according to claim 15, wherein the fibrous structure having the same polarity as the first polarity of the electrophoretic particle is formed by adding a chemical substance to the fibrous structure, the chemical substance having a same polarity as the first polarity of the electrophoretic particle.

18. A display comprising
   an electrophoretic device between a pair of bases, one or both of the bases being optically transmissive, and each of the bases including an electrode, the electrophoretic device including
   a plurality of electrophoretic particles in an insulating liquid,
   a porous layer formed of a fibrous structure in the insulating liquid,
   wherein the fibrous structure has a same polarity as a polarity of the electrophoretic particles regardless of migration direction of the electrophoretic particles passing through the fibrous structure and wherein the polarity of the fibrous structure is unvarying.

19. An electrophoretic device comprising:
   a plurality of electrophoretic particles in an insulating liquid; and
   a porous layer formed of a fibrous structure in the insulating liquid,
   wherein the fibrous structure includes a plurality of non-migrating particles arranged such that a standard deviation (δ) of a diameter of the fibrous structure is in a range of $0.1 \leq \delta \leq 0.3$.

20. The electrophoretic device according to claim 19, wherein the fibrous structure is formed of one or more of polymer materials or inorganic materials.

21. The electrophoretic device according to claim 19, wherein the non-migrating particles are formed of one or more of organic pigments, inorganic pigments, dye, carbon materials, metal materials, metal oxides, glass, or polymer materials.

22. The electrophoretic device according to claim 19, wherein the non-migrating particles include titanium oxide.

23. The electrophoretic device according to claim 19, wherein the fibrous structure holds the plurality of non-migrating particles.

24. A method of manufacturing an electrophoretic device, the method comprising:
   adding a plurality of non-migrating particles to a fibrous structure, wherein the plurality of the non-migrating particles are arranged such that a standard deviation (δ) of a diameter of the fibrous structure is in a range of $0.1 \leq \delta \leq 0.3$.

25. A display comprising
   an electrophoretic device between a pair of bases, one or both of the bases being optically transmissive, and each of the bases including an electrode, the electrophoretic device including
   a plurality of electrophoretic particles in an insulating liquid, and
   a porous layer formed of a fibrous structure in the insulating liquid,
   wherein the fibrous structure includes a plurality of non-migrating particles, the non-migrating particles having reflection characteristics different from reflection characteristics of the electrophoretic particles, wherein the non-migrating particles are present in an amount within a predetermined range and are dispersed in the fibrous structure, wherein the fibrous structure has a same polarity as a polarity of the electrophoretic particles regardless of migration direction of the electrophoretic particles passing through the fibrous structure and wherein the polarity of the fibrous structure is unvarying.

* * * * *